US012711882B2

(12) United States Patent
Baek et al.

(10) Patent No.: US 12,711,882 B2
(45) Date of Patent: Aug. 18, 2026

(54) METHOD FOR INSPECTING DISPLAY PANEL

(71) Applicant: Samsung Display Co., Ltd., Yongin-si (KR)

(72) Inventors: Seokgi Baek, Yongin-si (KR); Duhyun Kim, Yongin-si (KR); In Cheol Song, Yongin-si (KR); Eunchul Shin, Yongin-si (KR); Ki-Hoon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/050,855

(22) Filed: Feb. 11, 2025

(65) Prior Publication Data

US 2026/0011273 A1 Jan. 8, 2026

(30) Foreign Application Priority Data

Jul. 2, 2024 (KR) ........................ 10-2024-0087161

(51) Int. Cl.
*G09G 3/32* (2016.01)
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2330/12* (2013.01)

(58) Field of Classification Search
CPC ................. G09G 3/006; G09G 3/3233; G09G 2300/0819; G09G 2300/0842; G09G 2300/0861; G09G 2310/08; G09G 2330/12
See application file for complete search history.

(56) References Cited

U.S. PATENT DOCUMENTS

2011/0084955 A1 4/2011 Kim
2020/0106421 A1* 4/2020 Puckett .................. H03K 3/011
2022/0383815 A1* 12/2022 Toyomura ............ G09G 3/3233
2023/0169922 A1* 6/2023 Watakabe ............ G09G 3/3233
345/204

FOREIGN PATENT DOCUMENTS

KR 10-1101070 B1 12/2011

* cited by examiner

*Primary Examiner* — Michael A Faragalla
(74) *Attorney, Agent, or Firm* — Womble Bond Dickinson (US) LLP

(57) ABSTRACT

A method for inspecting a display panel includes in a pixel comprising a light emitting element and a first transistor connected to the light emitting element, applying a first voltage to a first electrode of the first transistor; applying a second voltage having a lower level than the first voltage to a second electrode of the first transistor; applying a control voltage to a control electrode of the first transistor; gradually varying a level of the control voltage such that the level of the control voltage is lowered; and measuring a current flowing through the first transistor via a data line connected to the first electrode of the first transistor, wherein an initial level of the control voltage is the same as the level of the first voltage.

18 Claims, 17 Drawing Sheets

METHOD FOR INSPECTING DISPLAY PANEL

CROSS-REFERENCE TO RELATED APPLICATION

The present application claims priority to and the benefit of Korean Patent Application No. 10-2024-0087161, filed on Jul. 2, 2024, in the Korean Intellectual Property Office, the entire disclosure of which is incorporated herein by reference.

BACKGROUND

1. Field

Aspects of embodiments of the present disclosure relate to a method for inspecting a display panel.

2. Description of the Related Art

In general, an electronic device which provides images to a user, such as a smart phone, a digital camera, a laptop computer, a navigation system, and a smart television, includes a display device for displaying the images. The display device generates an image, and provides the generated image to a user through a display screen.

Pixels are provided with scan signals, light emission signals, and data voltages to be driven, and thereby generate an image. Each of the pixels includes a plurality of transistors and a light emitting element driven by the plurality of transistors. A driving transistor among the transistors is connected to the light emitting element to control the amount of current provided to the light emitting element.

If the properties of the driving transistor are not normal, the pixel may not be normally driven. Therefore, there is a demand for the development of technology for inspecting properties of a driving transistor.

The above information disclosed in this Background section is only for enhancement of understanding of the background of the invention and therefore it may contain information that does not form the prior art.

SUMMARY

Aspects of the present disclosure are directed to a method for inspecting a display panel, the method capable of easily measuring properties of a driving transistor.

According to some embodiments of the present disclosure, there is provided a method for inspecting a display panel, the method including: in a pixel including a light emitting element and a first transistor connected to the light emitting element, applying a first voltage to a first electrode of the first transistor; applying a second voltage having a lower level than the first voltage to a second electrode of the first transistor; applying a control voltage to a control electrode of the first transistor; gradually varying a level of the control voltage such that the level of the control voltage is lowered; and measuring a current flowing through the first transistor via a data line connected to the first electrode of the first transistor, wherein an initial level of the control voltage is the same as the level of the first voltage.

In some embodiments, the varying of the level of the control voltage may include gradually decreasing the level of the control voltage to a first level that is lower than the initial level.

In some embodiments, the first transistor may be turned off based on an absolute value of the control voltage being smaller than an absolute value of the first level.

In some embodiments, the measuring of a current flowing through the first transistor may include measuring an off current flowing through the turned-off first transistor.

In some embodiments, the varying of the level of the control voltage further may include gradually decreasing the level of the control voltage to a second level that is lower than the first level.

In some embodiments, the first transistor may be turned on based on the absolute value of the control voltage being larger than the absolute value of the first level.

In some embodiments, the measuring of a current flowing through the first transistor may include measuring an on current flowing through the first transistor that is turned on.

In some embodiments, the level of the control voltage may gradually decrease by a set voltage magnitude from the initial level to the second level.

In some embodiments, the varying of the level of the control voltage may further include gradually increasing the level of the control voltage from the second level to the initial level.

In some embodiments, the first level and the second level may be set to a level of a negative voltage.

In some embodiments, the initial level may be about 0 V.

In some embodiments, the second voltage may be set to a negative voltage.

In some embodiments, the first transistor may be a PMOS transistor.

In some embodiments, the pixel may further include: a second transistor connected to the data line and the first electrode of the first transistor, and configured to be selectively switched by a write scan signal; a third transistor connected to the second electrode of the first transistor and the control electrode of the first transistor, and configured to be selectively switched by a compensation scan signal; a fourth transistor connected to a first initialization line to which the control voltage is applied and the control electrode of the first transistor, and configured to be selectively switched by an initialization scan signal; a fifth transistor connected to a first power line and the first electrode of the first transistor, and configured to be selectively switched by a light emission signal; a sixth transistor connected to the second electrode of the first transistor and an anode of the light emitting element, and configured to be selectively switched by the light emission signal; a seventh transistor connected to the anode of the light emitting element and a second initialization line to which the second voltage is applied, and configured to be selectively switched by a bias scan signal; an eighth transistor connected to the first electrode of the first transistor and a bias line, and configured to be selectively switched by the bias scan signal; and a capacitor connected to the first power line and the control electrode of the first transistor. The first voltage may be applied to the data line, the first power line, and the bias line.

In some embodiments, the third transistor may be turned off, and the second, fourth, fifth, sixth, seventh, and eighth transistors may be turned on based on the current flowing through the first transistor being measured.

In some embodiments, a plurality of pixels including the pixel may be arranged in rows and columns; the level of the control voltage may gradually decrease to the first level; and in each one of the pixels arranged in rows of 10% of all rows, a current flowing through the first transistor may be measured.

In some embodiments, the second transistor of each one of the pixels arranged in the 10% of all rows may be turned on by the write scan signal in response to the bias scan signal and the light emission signal being activated to a level for turning on the fifth to eighth transistors.

According to some embodiments of the present disclosure, there is provided a method for inspecting a display panel, the method including: applying a first voltage to a first electrode of a first transistor connected to a light emitting element; applying a second voltage having a lower level than the first voltage to a second electrode of the first transistor; applying a control voltage to a control electrode of the first transistor; gradually varying a level of the control voltage such that the level of the control voltage is lowered; and measuring a current flowing through the first transistor via a data line connected to the first electrode of the first transistor, wherein the varying of the level of the control voltage includes: gradually decreasing the level of the control voltage to a first level which is lower than an initial level; and gradually decreasing the level of the control voltage to a second level which is lower than the first level, wherein the first transistor is turned off based on an absolute value of the control voltage being smaller than an absolute value of the first level; and wherein the first transistor is turned on based on the absolute value of the control voltage being larger than the absolute value of the first level.

In some embodiments, the level of the control voltage may gradually decrease by increments of a set voltage magnitude from the initial level to the second level.

In some embodiments, the varying of the level of the control voltage may further include gradually increasing the level of the control voltage from the second level to the initial level.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
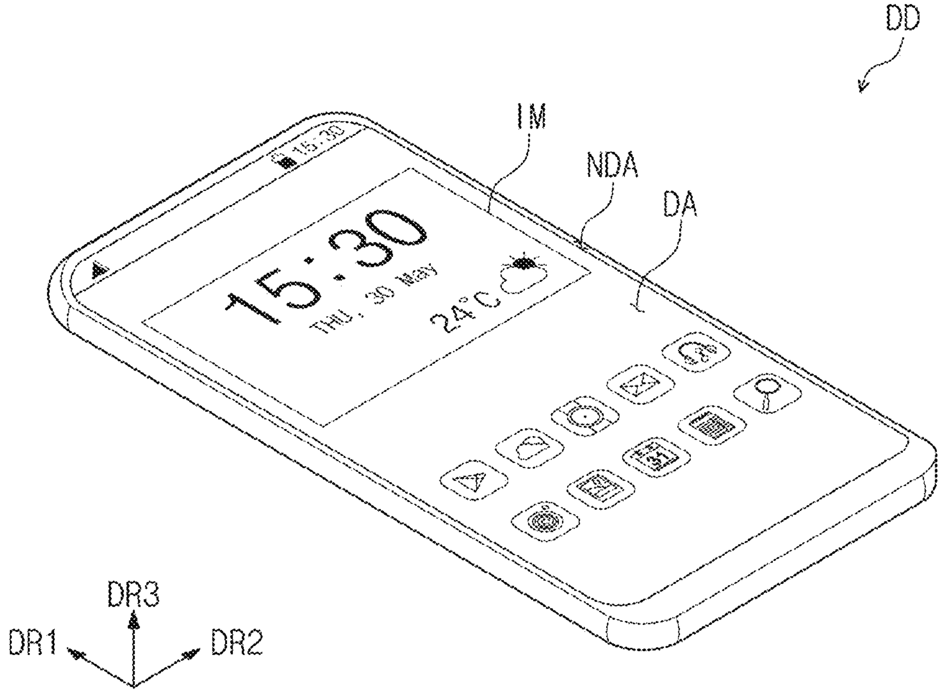
FIG. 1 is a perspective view of a display device including a display panel tested according to some embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device including a display panel tested according to some embodiments of the present disclosure.

Referring to FIG. 1, a display device DD according to some embodiments of the present disclosure may have long sides extending in a first direction DR1, and may have short sides extending in a second direction DR2 intersecting the first direction DR1. A corner of the display device DD may have a round shape. The shape of the display device DD illustrated in FIG. 1 is illustrated, and the shape of the display device DD is not limited to the shape illustrated in FIG. 1.

Hereinafter, a direction substantially perpendicularly intersecting a plane defined by the first direction DR1 and the second direction DR2 is defined as a third direction DR3.

Images IM generated in the display device DD may be provided to a user through an upper surface of the display device DD viewed in the third direction DR3. The upper surface of the display device DD may include a display region DA and a non-display region NDA around the display region DA. The display region DA may display an image, and the non-display region NDA may not display an image. The non-display region NDA may surround the display region DA, and may define the edge of the display device DD to be printed in a set color (e.g., a preset color or a predetermined color).

For example, the display device DD is illustrated as a mobile phone, but without being limited thereto, the display device DD may be used for various electronic devices. For example, the display device DD may be used for large electronic devices, such as televisions, monitors, external advertisement boards, or the like. For example, the display device DD may be used for small-and-medium-sized electronic devices, such as personal computers, laptops, car navigation systems, game consoles, tablets, cameras, or the like.

Figure 2:
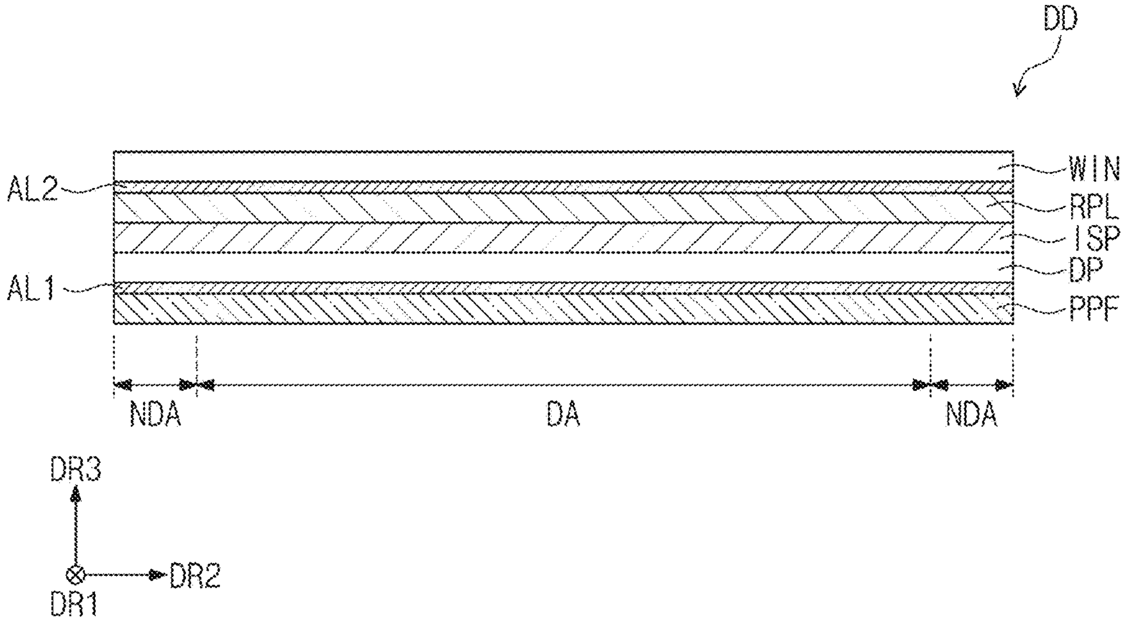
FIG. 2 is a view illustrating a cross-section of the display device illustrated in FIG. 1 according to some embodiments of the present disclosure.

FIG. 2 is a view illustrating a cross-section of the display device illustrated in FIG. 1 according to some embodiments of the present disclosure.

For example, FIG. 2 illustrates a cross-section of the display device DD viewed in the first direction DR1.

Referring to FIG. 2, the display device DD may include a display panel DP, an input sensing part ISP, a reflection prevention layer RPL, a window WIN, a panel protection film PPF, and first and second adhesive layers AL1 and AL2.

The display panel DP according to some embodiments of the present disclosure may be a light emitting-type display panel. For example, the display panel DP may be an organic light emitting display panel or inorganic light emitting display panel. A light emitting layer of the organic light emitting display panel may include an organic light emitting material. A light emitting layer of the inorganic light emitting display panel may include a quantum dot, a quantum load, and/or the like. Hereinafter, the display panel DP will be described as the organic light emitting display panel.

The input sensing part ISP may be disposed on the display panel DP. The input sensing part ISP may include a plurality of sensing units for sensing external inputs in a capacitive manner. The input sensing part ISP may be manufactured directly on the display panel DP when manufacturing the display device DD. However, the present disclosure is not limited thereto, and the input sensing part ISP may be manufactured as a separate panel from the display panel DP, and may be attached to the display panel DP by an adhesive layer.

The reflection prevention layer RPL may be disposed on the input sensing part ISP. The reflection prevention layer RPL may be manufactured directly on the input sensing part ISP when manufacturing the display device DD. However, the present disclosure is not limited thereto, and the reflection prevention layer RPL may be manufactured as a separate panel, and may be attached to the input sensing part ISP by an adhesive layer.

The reflection prevention layer RPL may be an external light reflection prevention film. The reflection prevention layer RPL may reduce the reflectance of external light incident from above the display device DD toward the display panel DP. External light reflecting off the display device may not be visible to a user or may have significantly reduced visibility due to the reflection prevention layer RPL.

When external light traveling toward the display panel DP is reflected from the display panel DP and provided back to an external user, like a mirror, the user may visually recognize the external light. In order to prevent or significantly reduce the occurrence of the above-described phenomenon, illustratively, the reflection prevention layer RPL may include a plurality of color filters for displaying the same color as pixels of the display panel DP.

The color filters may filter the external light to the same color as the pixels. In this case, the external light may not be visually recognized by a user. However, the present disclosure is not limited thereto, and the reflection prevention layer RPL may include a phase retarder and/or a polarizer in order to reduce the reflectance of the external light.

The window WIN may be disposed on the reflection prevention layer RPL. The window WIN may protect the display panel DP, the input sensing part ISP, and the reflection prevention layer RPL from external scratches and impacts.

The panel protection film PPF may be disposed below the display panel DP. The panel protection film PPF may protect a lower portion of the display panel DP. The panel protection film PPF may include a flexible plastic material such as polyethylene terephthalate (PET).

The first adhesive layer AL1 may be disposed between the display panel DP and the panel protection film PPF, and by the first adhesive layer AL1, the display panel DP and the panel protection film PPF may be bonded to each other. The second adhesive layer AL2 may be disposed between the window WIN and the reflection prevention layer RPL, and by the second adhesive layer AL2. the window WIN and the reflection prevention layer RPL may be bonded to each other.

Figure 3:
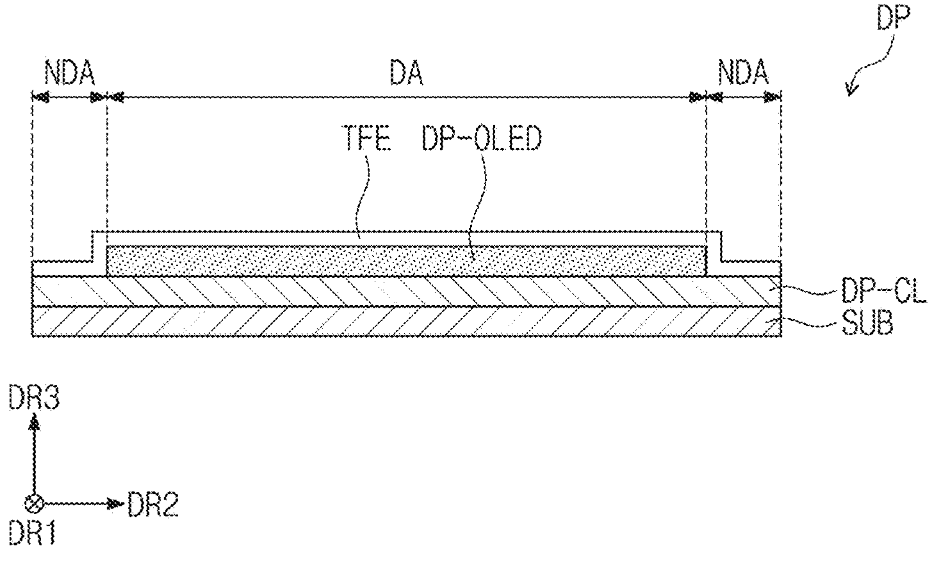
FIG. 3 is a view illustrating a cross-section of the display panel illustrated in FIG. 2 according to some embodiments of the present disclosure.

FIG. 3 is a view illustrating a cross-section of a display panel illustrated in FIG. 2 according to some embodiments of the present disclosure.

Illustratively, FIG. 3 illustrates a cross-section of the display panel DP viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display region DA and a non-display region NDA around the display region DA. The substrate SUB may include a flexible plastic material, such as glass or polyimide (PI). The display element layer DP-OLED may be disposed on the display region DA.

A plurality of pixels may be disposed on the circuit element layer DP-CL and the display element layer DP-OLED. The pixels may include transistors disposed on the circuit element layer DP-CL and light emitting elements disposed on the display element layer DP-OLED and connected to the transistors.

The thin film encapsulation layer TFE may be disposed on the circuit element layer DP-CL to cover the display element layer DP-OLED. The thin film encapsulation layer TFE may protect the pixels from moisture, oxygen, and a foreign material.

Figure 4:
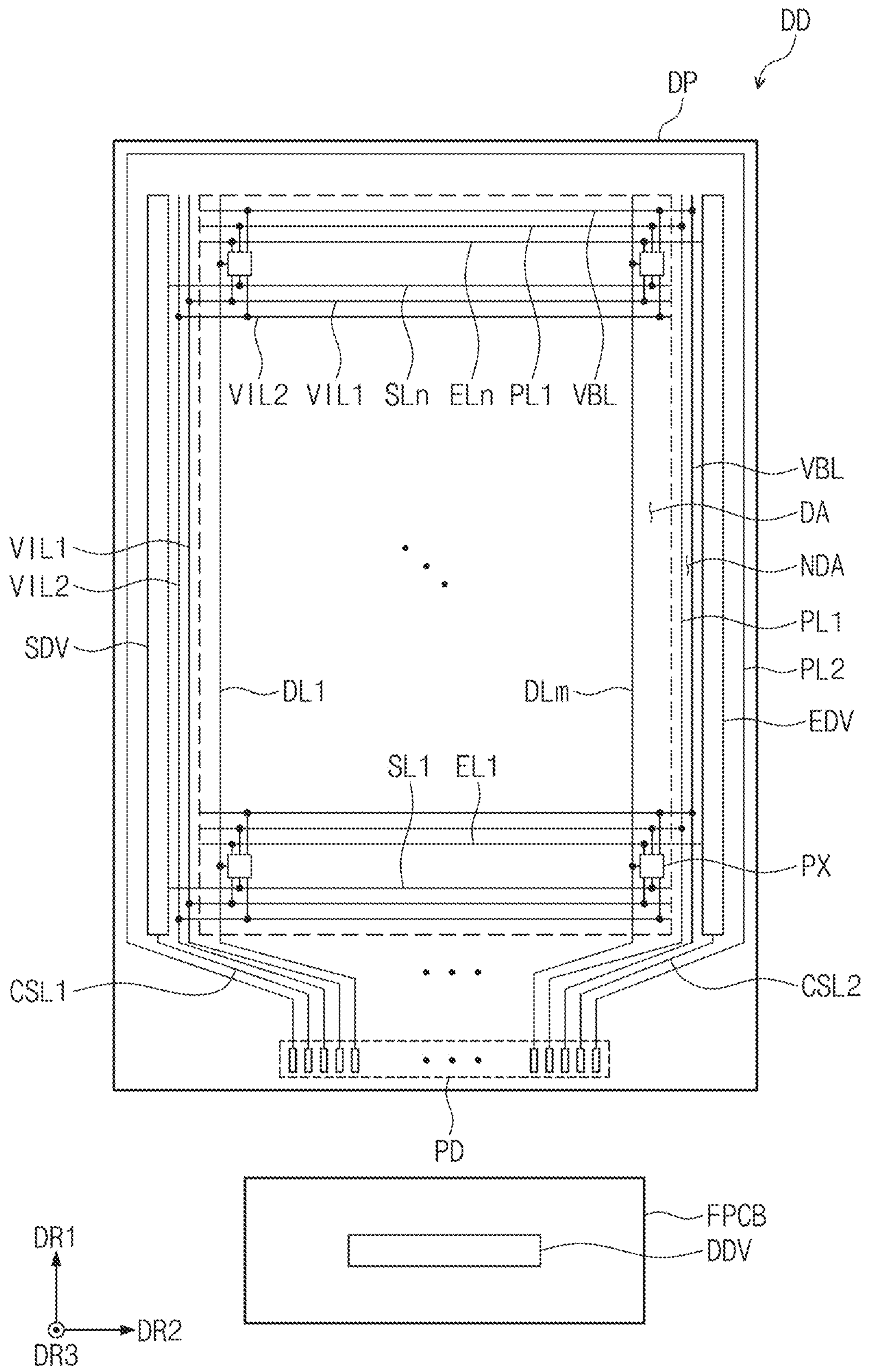
FIG. 4 is a plan view of the display panel illustrated in FIG. 2 according to some embodiments of the present disclosure.

FIG. 4 is a plan view of the display panel illustrated in FIG. 2 according to some embodiments of the present disclosure.

Referring to FIG. 4, the display device DD may include the display panel DP, a scan driver SDV, a data driver DDV, a light emission driver EDV, a flexible printed circuit board FPCB, and a plurality of pads PD.

The display panel DP may have a rectangular shape which has long sides extending in the first direction DR1 and short sides extending in the second direction DR2, but the shape of the display panel DP is not limited thereto. The display panel DP may include a display region DA and a non-display region NDA surrounding the display region DA.

The display panel DP may include a plurality of pixels PX, a plurality of scan lines SL1 to SLn, a plurality of data lines DL1 to DLm, a plurality of light emission lines EL1 to ELn, first and second control lines CSL1 and CSL2, first and second power lines PL1 and PL2, first and second initialization lines VIL1 and VIL2, and a bias line VBL. In this case, m and n are natural numbers.

The pixels PX may be disposed in the display region DA. The pixels PX may be arranged in a plurality of rows and a plurality of columns. The rows may correspond to the second direction DR2, and the columns may correspond to the first direction DR1.

The scan driver SDV and the light emission driver EDV may be disposed in the non-display region NDA, respectively adjacent to both sides of the display region DA opposite to each other in the second direction DR2. In other words, the light emission driver EDV and the scan driver SDV each may be in the non-display region NDA and may be on opposite sides of the display region DA. The data driver DDV may be disposed on the flexible printed circuit board FPCB.

The pads PD may be disposed in a non-display region NDA adjacent to any one cross-section (e.g., a lower end of the display panel) of the display panel DP. The flexible printed circuit board FPCB may be connected to the pads PD. The data driver DDV may be connected to the display panel DP through the flexible printed circuit board FPCB.

The scan lines SL1 to SLn may be extended in the second direction DR2 to be connected to the pixels PX and the scan driver SDV. The data lines DL1 to DLm may be extended in the first direction DR1 to be connected to the pixels PX and the pads PD. The light emission lines EL1 to ELn may be extended in the second direction DR2 to be connected to the pixels PX and the light emission driver EDV. The data driver DDV may be connected to the pads PD, which are connected to the data lines DL1 to DLm, through the flexible printed circuit board FPCB.

A first power line PL1 may be extended in the first direction DR1 in the non-display region NDA. In the non-display region NDA, the first power line PL1 may be disposed between the display region DA and the light emission driver EDV. The first power line PL1 may be extended in the second direction DR2 toward the display region DA, and may be connected to the pixels PX. A first driving voltage may be applied to the pixels PX through the first power line PL1. The first power line PL1 may be connected to a corresponding pad PD among the pads PD.

A second power line PL2 may be disposed in the non-display region NDA, and may extend along the long sides of the display panel DP and one short side (e.g., an upper end of the display panel) of the display panel DP. The second power line PL2 may be disposed further outside than the scan driver SDV and the light emission driver EDV. The second power line PL2 may be connected to corresponding pads PD among the pads PD.

The second power line PL2 may be extended toward the display region DA to be connected to the pixels PX. A second driving voltage having a lower level than the first driving voltage may be applied to the pixels PX through the second power line PL2.

The first initialization line VIL1 and the second initialization line VIL2 may extend in the first direction DR1 in the non-display region NDA. In the non-display region NDA, the first initialization line VIL1 and the second initialization line VIL2 may be disposed between the display region DA and the scan driver SDV. The first initialization line VIL1 and the second initialization line VIL2 may extend in the second direction DR2 toward the display region DA, and may be connected to the pixels PX.

The first and second initialization lines VIL1 and VIL2 may be connected to corresponding pads PD among the pads PD. A first initialization voltage may be applied to the pixels PX through the first initialization line VIL1. A second initialization voltage may be applied to the pixels PX through the second initialization line VIL2.

In the non-display region NDA, the bias line VBL may extend in the first direction DR1. In the non-display region NDA, the bias line VBL may be disposed between the display region DA and the light emission driver EDV. The bias line VBL may extend in the second direction DR2 toward the display region DA, and may be connected to the pixels PX. The bias line VBL may be connected to a corresponding pad PD among the pads PD. A bias voltage may be applied to the pixels PX through the bias line VBL.

A first control line CSL1 may be connected to the scan driver SDV, and may be extended toward the lower end of the display panel DP. A second control line CSL2 may be connected to the light emission driver EDV, and may be extended toward the lower end of the display panel DP. The first and second control lines CSL1 and CSL2 may be connected to corresponding pads PD among the pads PD.

The display device DD may further include a timing controller for controlling the operation of the scan driver SDV, the data driver DDV, and the light emission driver EDV. The timing controller may be connected to the flexible printed circuit board FPCB through a printed circuit board.

The scan driver SDV may generate a plurality of scan signals, and the scan signals may be applied to the pixels PX through the scan lines SL1 to SLn. The data driver DDV may generate a plurality of data voltages, and the data voltages may be applied to the pixels PX through the data lines DL1 to DLm. The light emission driver EDV may generate a plurality of light emission signals, and the light emission signals may be applied to the pixels PX through the light emission lines EL1 to ELn.

The pixels PX may be provided with the data voltages in response to the scan signals. The pixels PX may display an image by emitting light of luminance corresponding to the data voltages in response to the light emission signals.

Figure 5:
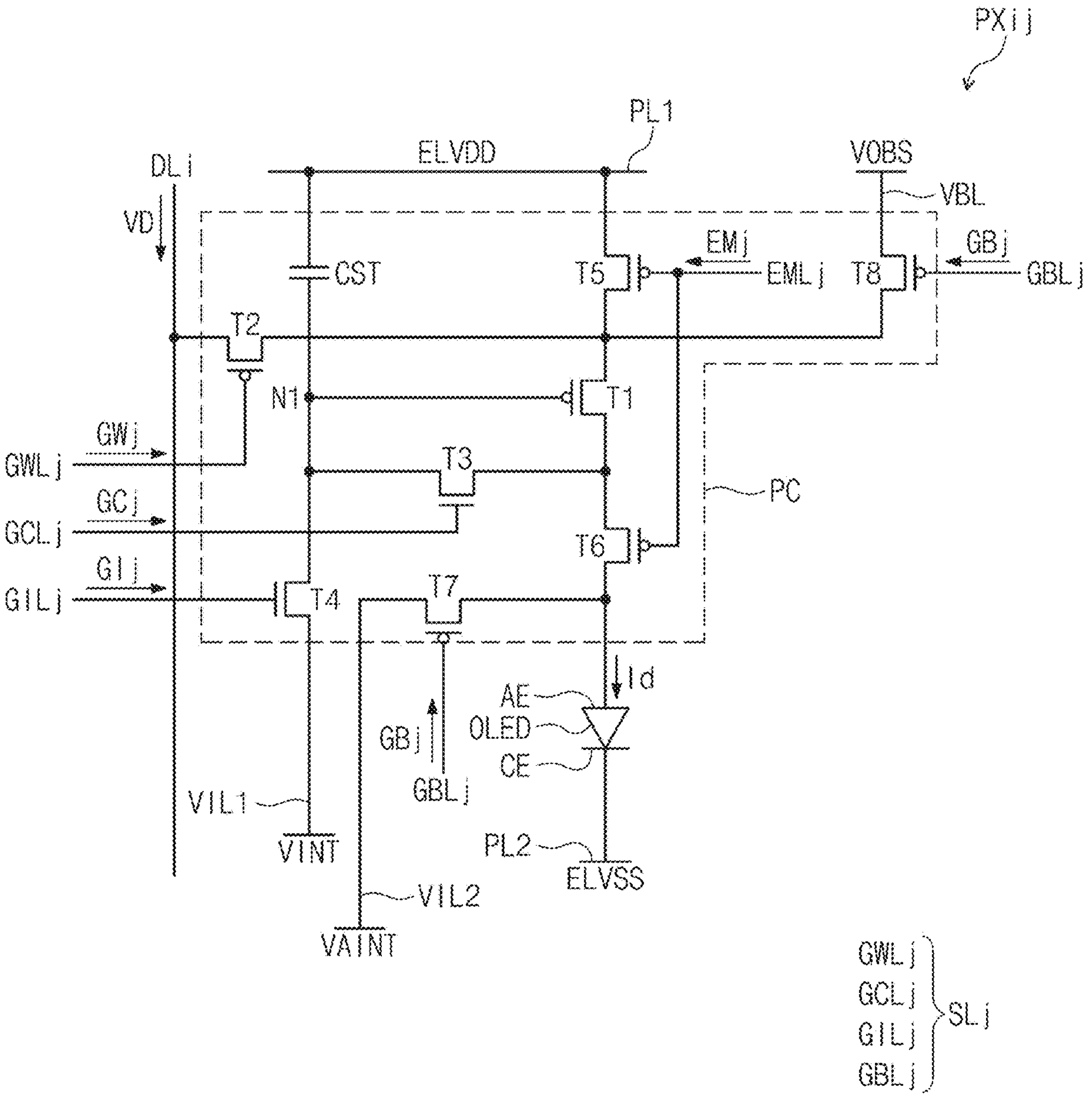
FIG. 5 is a view illustrating an equivalent circuit of one pixel among pixels illustrated in FIG. 4 according to some embodiments of the present disclosure.

FIG. 5 is a view illustrating an equivalent circuit of one pixel among pixels illustrated in FIG. 4 according to some embodiments of the present disclosure.

Illustratively, FIG. 5 illustrates a pixel PXij connected to an i-th data line DLi, a j-th scan line SLj, and a j-th light emission line EMLj. In this case, i and j may be natural numbers.

Referring to FIG. 5, the pixel PXij may include a pixel circuit PC and a light emitting element OLED connected to the pixel circuit PC. The pixel circuit PC may drive the light emitting element OLED.

The pixel circuit PC may include a plurality of transistors T1 to T8 and a capacitor CST. The transistors T1 to T8 and the capacitor CST may control the amount of current flowing through the light emitting element OLED. The light emitting element OLED may generate light having a ser (e.g., preset or predetermined) luminance according to the amount of current received.

The j-th scan line SLj may include a j-th write scan line GWLj, a j-th compensation scan line GCLj, a j-th initialization scan line GILj, and a j-th bias scan line GBLj.

The j-th write scan line GWLj may receive a j-th write scan signal GWj, and the j-th compensation scan line GCLj may receive a j-th compensation scan signal GCj. The j-th initialization scan line GILj may receive a j-th initialization scan signal GIj, and the j-th bias scan line GBLj may receive a j-th bias scan signal GBj. The j-th light emission line EMLj may receive a j-th light emission signal EMj.

The pixel PXij may be connected to the i-th data line DLi, the j-th write scan line GWLj, the j-th compensation scan line GCLj, the j-th initialization scan line GILj, the j-th bias scan line GBLj, the j-th light emission line EMLj, the first initialization line VIL1, the second initialization line VIL2, the bias line VBL, and the first and second power lines PL1 and PL2.

A first initialization voltage VINT may be applied to the first initialization line VIL1, and a second initialization voltage VAINT may be applied to the second initialization line VIL2. A bias voltage VOBS may be applied to the bias line VBL. The first power line PL1 may receive a first driving voltage ELVDD, and the second power line PL2 may receive a second driving voltage ELVSS.

The transistors T1 to T8 may each include a source electrode, a drain electrode, and a gate electrode. Hereinafter, in FIG. 5, any one of the source electrode and the drain electrode is defined as a first electrode, and the other one thereof is defined as a second electrode, for convenience. In addition, the gate electrode is defined as a control electrode.

The transistors T1 to T8 may include first to eighth transistors T1 to T8. The first, second, and fifth to eighth transistors T1, T2, and T5 to T8 may PMOS transistors. The third and fourth transistors T3 and T4 may be NMOS transistors.

The first transistor T1 may be defined as a driving transistor, and the second transistor T2 may be defined as a switching transistor. The third transistor T3 may be defined as a compensation transistor. The fourth transistor T4 and the seventh transistor T7 may be defined as initialization transistors. The fifth transistor T5 and the sixth transistor T6 may be defined as light emission control transistors. The eighth transistor T8 may be defined as a bias transistor.

The light emitting element OLED may be defined as an organic light emitting element. The light emitting element OLED may include an anode AE and a cathode CE. The anode AE may receive the first driving voltage ELVDD through the sixth, first, and fifth transistors T6, T1, and T5. The first driving voltage ELVDD may be applied to the pixel circuit PC through the first power line PL1.

The cathode CE may receive the second driving voltage ELVSS having a lower level than the first driving voltage ELVDD. The second driving voltage ELVSS may be applied to the pixel circuit PC through the second power line PL2.

The first transistor T1 may be disposed between the fifth transistor T5 and the sixth transistor T6, and may be connected to the fifth transistor T5 and the sixth transistor T6. The first transistor T1 may be connected to the first power line PL1 through the fifth transistor T5, and may be connected to the anode AE of the light emitting element OLED through the sixth transistor T6.

The first transistor T1 may include a first electrode connected to the first power line PL1 through the fifth transistor T5, a second electrode connected to the anode AE through the sixth transistor T6, and a control electrode connected to a first node N1.

The first electrode of the first transistor T1 may be connected to the fifth transistor T5, and the second electrode of the first transistor T1 may be connected to the sixth transistor T6. The first transistor T1 may control the amount of current flowing through the light emitting element OLED according to a voltage of the first node N1 applied to the control electrode of the first transistor T1.

The second transistor T2 may be connected to the first transistor T1 and the i-th data line DLi and may be switched by the j-th write scan signal GWj. The second transistor T2 may include a first electrode connected to the i-th data line DLi, a second electrode connected to the first electrode of the first transistor T1, and a control electrode connected to the j-th write scan line GWLj.

The second transistor T2 may be turned on by the j-th write scan signal GWj received through the j-th write scan line GWLj to electrically connect the i-th data line DLi to the first electrode of the first transistor T1. The second transistor T2 may perform a switching operation of providing a data voltage VD received through the i-th data line DLi to the first electrode of the first transistor T1.

The third transistor T3 may be connected to the second electrode of the first transistor T1 and the first node N1, and may be switched by the j-th compensation scan signal GCj. The third transistor T3 may be connected to the control electrode of the first transistor T1 through the first node N1. The third transistor T3 may include a first electrode connected to the second electrode of the first transistor T1, a second electrode connected to the first node N1, and a control electrode connected to the j-th compensation scan line GCLj.

The third transistor T3 may be turned on by the j-th compensation scan signal GCj received through the j-th compensation scan line GCLj and electrically connect the second electrode of the first transistor T1 to the control electrode of the first transistor T1. When the third transistor T3 is turned on, the first transistor T1 and the third transistor T3 may be connected in a diode form.

The fourth transistor T4 may be connected to the first initialization VIL1 and the first node N1, and may be switched by the j-th initialization scan signal GIj. The fourth transistor T4 may be connected to the control electrode of the first transistor T1 through the first node N1. The fourth transistor T4 may include a first electrode connected to the first node N1, a second electrode connected to the first initialization line VIL1, and a control electrode connected to the j-th initialization scan line GILj.

The fourth transistor T4 may be turned on by the j-th initialization scan signal GIj received through the j-th initialization scan line GILj and provide the first initialization voltage VINT received through the first initialization line VIL1 to the first node ND.

The fifth transistor T5 may be connected to the first power line PL1 and the first electrode of the first transistor T1, and may be switched by the j-th light emission signal EMj. The fifth transistor T5 may include a first electrode connected to the first power line PL1, a second electrode connected to the first electrode of the first transistor T1, and a control electrode connected to the j-th light emission line EMLj.

The sixth transistor T6 may be connected to the second electrode of the first transistor T1 and the anode AE of the light emitting element OLED, and may be switched by the j-th light emission signal EMj. The sixth transistor T6 may include a first electrode connected to the second electrode of the first transistor T1, a second electrode connected to the anode AE, and a control electrode connected to the j-th light emission line EMLj.

The fifth transistor T5 and the sixth transistor T6 may be turned on by the j-th light emission signal EMj received through the j-th light emission line EMLj. The first driving voltage ELVDD may be provided to the light emitting element OLED by the fifth transistor T5 and the sixth transistor T6 which are turned on, so that a driving current may flow through the light emitting element OLED. As a result, the light emitting element OLED may emit light.

The seventh transistor T7 may be connected to the anode AE of the light emitting element OLED and the second initialization line VIL2, and may be switched by the j-th bias scan signal GBj. The seventh transistor T7 may include a first electrode connected to the anode AE, a second electrode connected to the second initialization line VIL2, and a control electrode connected to the j-th bias scan line GBLj.

The seventh transistor T7 may be turned on by the j-th bias scan signal GBj received through the j-th bias scan line GBLj, and may provide the second initialization voltage VAINT received through the second initialization line VIL2 to the anode of the light emitting element OLED.

In some other embodiments of the present disclosure, the seventh transistor T7 may be omitted. In some embodiments of the present disclosure, the second initialization voltage VAINT may have a different level from the first initialization voltage VINT, but is not limited thereto, and may have the same level as the first initialization voltage VINT.

The seventh transistor T7 may improve the capability of the pixel PXij to express black. When the seventh transistor T7 is turned on, a parasitic capacitor of the light emitting element OLED may be discharged. Therefore, when black luminance is implemented, the light emitting element OLED does not emit light due to a leakage current from the first transistor T1, and accordingly, the black expression capability may be improved.

The eighth transistor T8 may be connected to the first electrode of the first transistor T1 and the bias line VBL, and may be switched by the j-th bias scan signal GBj. The ninth transistor T8 may include a first electrode connected to the bias line VBL, a second electrode connected to the first electrode of the first transistor T1, and a control electrode connected to the j-th bias line GBLj.

The eighth transistor T8 may be turned on by the j-th bias scan signal GBLj, and may provide the bias voltage VOBS received through the bias line VBL to the first electrode of the first transistor T1.

The capacitor CST may include a first electrode connected to the first power line PL1 and a second electrode connected to the control electrode of the first transistor T1 through the first node N1. When the fifth transistor T5 and the sixth transistor T6 are turned on, the amount of current flowing through the first transistor T1 may be determined according to a voltage stored in the capacitor CST.

Figure 6:
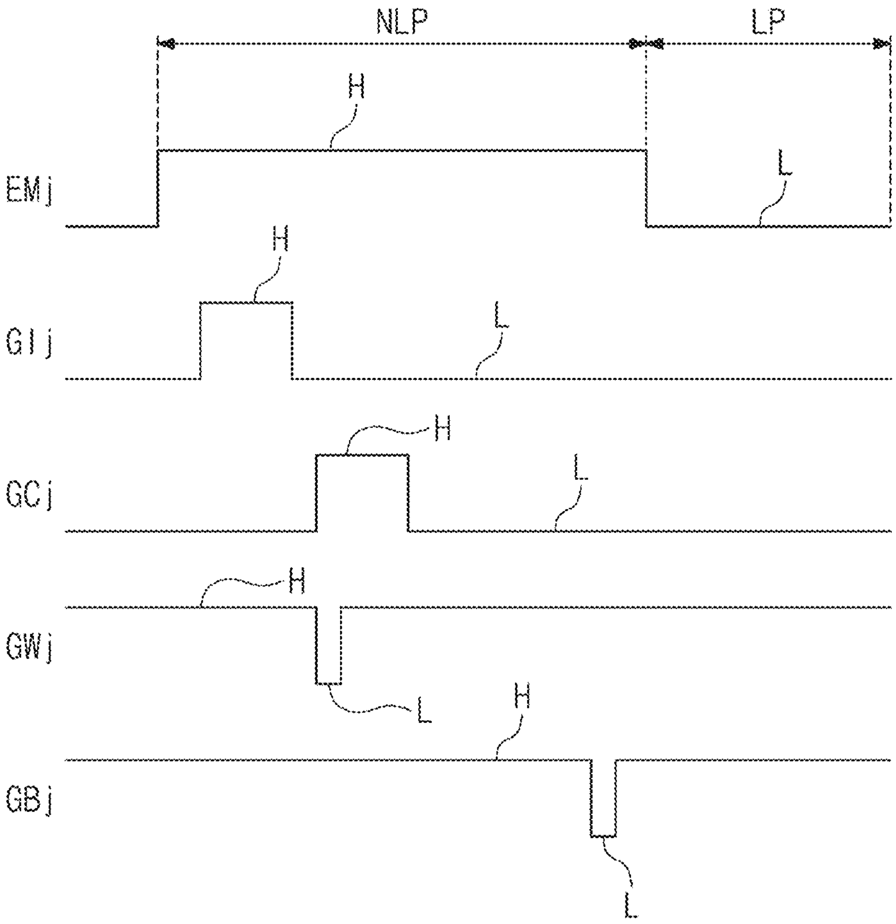
FIG. 6 is a timing diagram of scan signals and a light emission signal for describing an operation of the pixel illustrated in FIG. 5 according to some embodiments of the present disclosure.

FIG. 6 is a timing diagram of scan signals and a light emission signal for describing an operation of the pixel illustrated in FIG. 5 according to some embodiments of the present disclosure.

Referring to FIG. 5 and FIG. 6, the j-th light emission signal EMj may have a high level H during a non-light emission period NLP, and a low level L during a light emission period LP. An active period of the j-th light emission signal EMj may be defined as the low level L.

An active period of each of the j-th write scan signal GWj and the j-th bias scan signal GBj may be defined as the low level L of each of the j-th write scan signal GWj and the j-th bias scan signal GBj.

An active period of each of the j-th compensation scan signal GCj and the j-th initialization scan signal GIj may be defined as the high level H of each of the j-th compensation scan signal GCj and the j-th initialization scan signal GIj.

After the j-th initialization scan signal GIj is activated, the j-th compensation scan signal GCj and the j-th write scan signal GWj may be activated. Thereafter, the j-th bias scan signal GBj may be activated.

During the non-light emission period NLP, the j-th initialization scan signal GIj, the j-th compensation scan signal GCj, the j-th write scan signal GWj, and the j-th bias scan signal GBj, all of which are activated, may be applied to the pixel PXij.

The j-th initialization scan signal GIj may be applied to the fourth transistor T4 to turn on the fourth transistor T4. The first initialization voltage VINT may be provided to the first node N1 through the fourth transistor T4. Therefore, the first initialization voltage VINT may be applied to the control electrode of the first transistor T1, and the first transistor T1 may be initialized by the first initialization voltage VINT. The above-described operation may be defined as an initialization operation.

The j-th write scan signal GWj may be applied to the second transistor T2 to turn on the second transistor T2. In addition, the j-th compensation scan signal GCj may be applied to the third transistor T3 to turn on the third transistor T3.

The first transistor T1 and the third transistor T3 may be connected to each other in a diode form. In this case, a compensation voltage Vd−Vth reduced from the data voltage VD, which has been provided through the data line DLi, by a threshold voltage Vth of the first transistor T1 may be applied to the control electrode of the first transistor T1. The above-described operation may be defined as a write operation (or a programming operation) and a compensation operation (or a threshold voltage compensation operation).

The first driving voltage ELVDD and the compensation voltage Vd−Vth may be respectively applied to the first voltage and the second electrode of the capacitor CST. A charge corresponding to a difference between the voltage of the first electrode of the capacitor CST and the voltage of the second electrode of the capacitor CST may be stored in the capacitor CST.

Thereafter, the j-th bias scan signal GBj may be applied to the seventh and eighth transistors T7 and T8 to turn on the seventh and eighth transistors T7 and T8. The second initialization voltage VAINT may be provided to the anode AE through the seventh transistor T7 to initialize the anode AE to the second initialization voltage VAINT. The bias voltage VOBS may be applied to the first electrode of the first transistor T1 through the eighth transistor T8.

Thereafter, during the light emission period LP, the j-th light emission signal EMj may be applied to the fifth transistor T5 and the sixth transistor T6 to turn on the fifth transistor T5 and the sixth transistor T6. In this case, a driving current Id corresponding to a difference between the voltage of the control electrode of the first transistor T1 and the first driving voltage ELVDD may be generated. The driving current Id may be provided to the light emitting element OLED through the sixth transistor T6, so that the light emitting element OLED may emit light.

During the light emission period LP, a gate-source voltage Vgs of the first transistor T1 may be defined as Vgs=ELVDD−(Vd−Vth) by the capacitor CST. A current and voltage relation equation of the first transistor T1 may be defined as $Id=(½)\mu Cox(W/L)(Vgs-Vth)^2$. The above-described equation is a current and voltage relation equation of a typical transistor.

When Vgs is substituted into the current and voltage relation equation, the threshold voltage Vth may be removed, and the driving current Id may be proportional to the square value $ELVDD-Vd^2$ of a value obtained by subtracting the data voltage VD from the first driving voltage ELVDD. Therefore, the driving current Id may be determined regardless of the threshold voltage Vth of the first transistor T1.

The bias voltage VOBS may be applied to the first electrode of the first transistor T1 through the eighth transistor T8 after the threshold voltage of the first transistor T1 is compensated and before the light emitting element OLED emits light. The shift of a hysteresis curve of the first transistor T1 may be suppressed by the bias voltage VOBS. The above-described operation may be defined as a bias operation.

Figure 7:
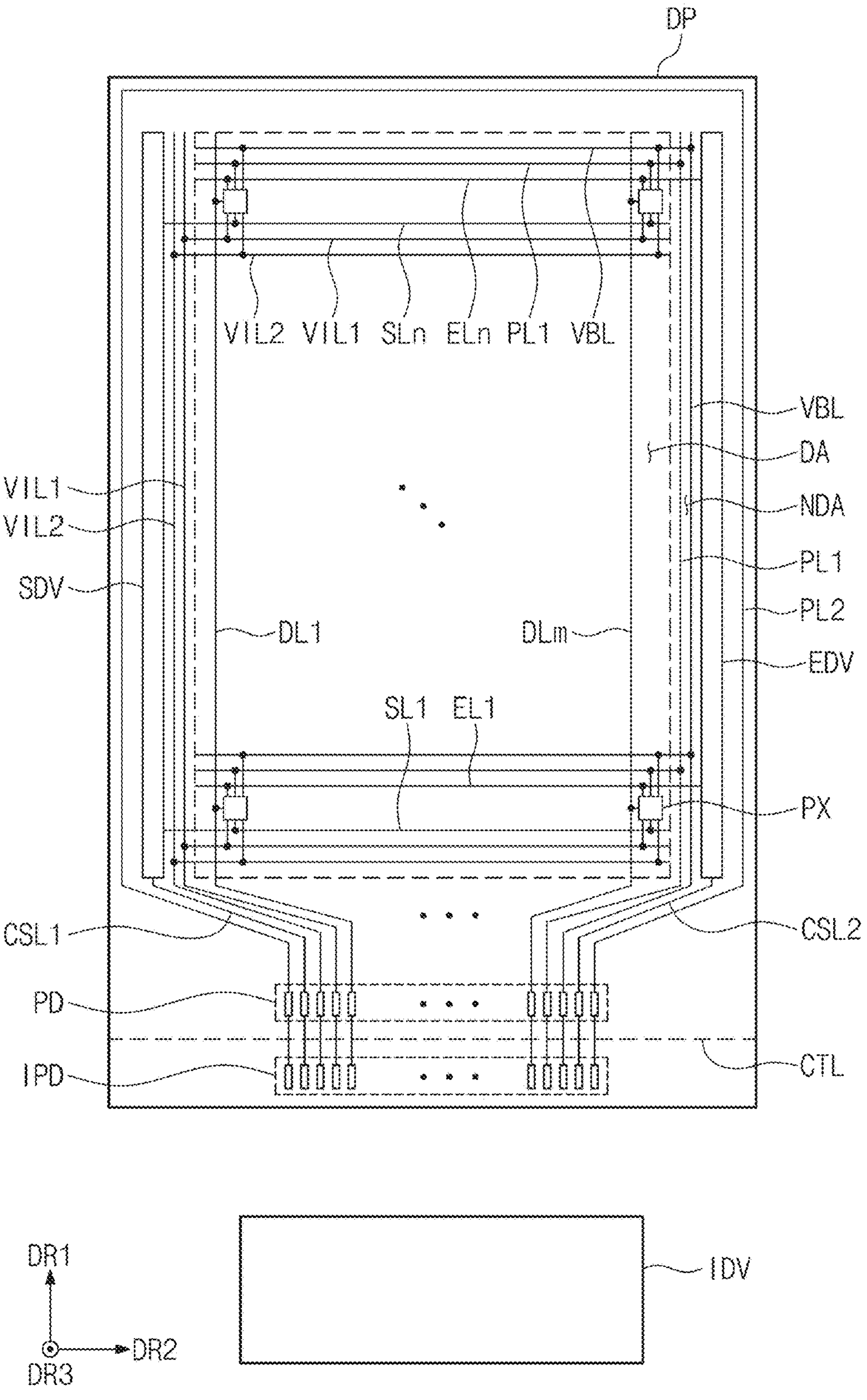
FIG. 7 is a view illustrating a display panel tested according to some embodiments of the present disclosure.

FIG. 7 is a view illustrating a display panel tested according to some embodiments of the present disclosure.

Referring to FIG. 7, during a step of manufacturing the display panel DP, the display panel DP may include a plurality of inspection pads IPD. The inspection pads IPD may be respectively connected to the pads PD. A cutting line CTL may be defined between the inspection pads IPD and the pads PD.

In order to inspect the display panel DP, an inspection device IDV may be used. As the inspection device IDV, a source measure unit (SMU) may be used. The inspection device IDV may be connected to the inspection pads IPD. For example, the inspection device IDV may contact the inspection pads IPD through a probe.

The inspection device IDV may provide various control signals and voltages to the pixels PX through the inspection pads IPD. The inspection device IDV may measure a current flowing through the first transistor T1 of each of the pixels PX. The above-described operation will be described in detail below.

After the inspection of the display panel DP is completed, a portion of the display panel DP is cut along the cutting line CTL, and the inspection pads IPD may be removed from the display panel DP. The display panel DP from which the inspection pads IPD are removed may be the display panel DP illustrated in FIG. 4.

Figure 8:
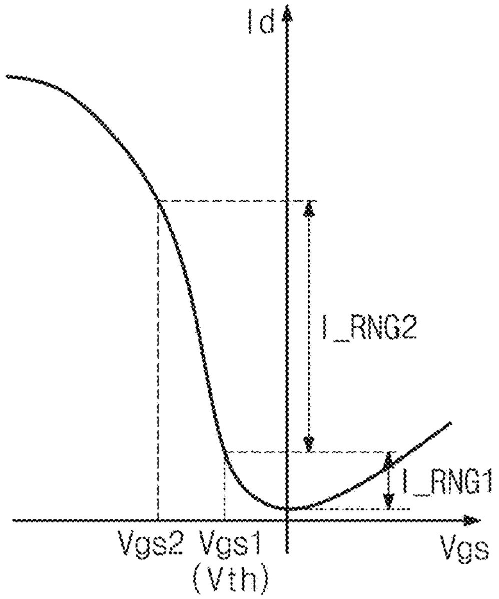
FIG. 8 is a view illustrating a current-voltage curve of a first transistor illustrated in FIG. 5 according to some embodiments of the present disclosure.

FIG. 8 is a view illustrating a current-voltage curve of a first transistor illustrated in FIG. 5 according to some embodiments of the present disclosure.

Referring to FIG. 8, according to the gate-source voltage Vgs of the first transistor T1, the driving current Id flowing through the first transistor T1 may vary. The gate-source voltage Vgs may include a first gate-source voltage Vgs1 having a negative value and a second gate-source voltage Vgs2 having a negative value. An absolute value of the second gate-source voltage Vgs2 may be greater than an absolute value of the first gate-source voltage Vgs1. The first gate-source voltage Vgs1 may be defined as the threshold voltage Vth of the first transistor T1.

A current range corresponding to 0 V to the first gate-source voltage Vgs1 may be defined as a first current range I_RNG1. For example, the first current range I_RNG1 may be about 1 nA to about 10 nA. A current range corresponding to the first gate-source voltage Vgs1 to the second gate-source voltage Vgs2 may be defined as a second current range I_RNG2. For example, the second current range I_RNG2 may be about 10 nA to about 100 nA.

Figure 9:
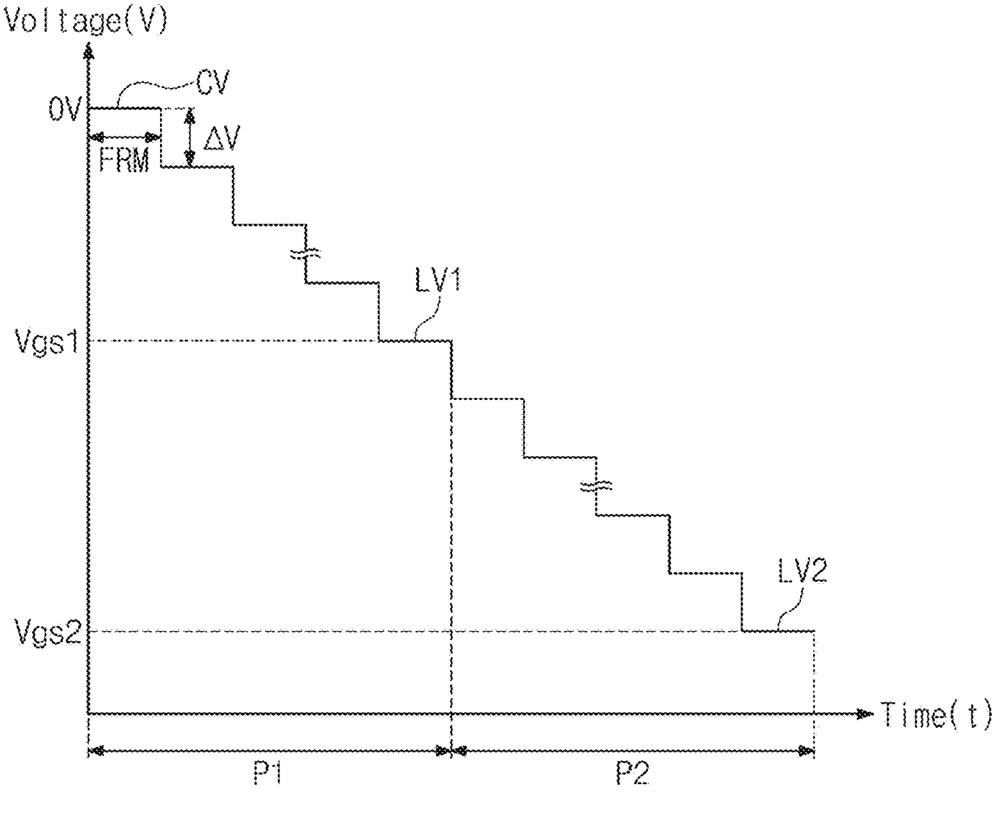
FIG. 9 is a view illustrating changes in the level of a control voltage applied to a pixel circuit illustrated in FIG. 5 during a test operation of a display panel according to some embodiments of the present disclosure.

FIG. 9 is a view illustrating changes in the level of a control voltage applied to a pixel circuit illustrated in FIG. 5 during a test operation of a display panel according to some embodiments of the present disclosure.

Referring to FIG. 9, a control voltage CV may be applied to the above-described first initialization line VIL1 (see, e.g., FIG. 7). Therefore, during an operation of inspecting the display panel DP, the control voltage CV may be applied to the control electrode of the first transistor T1 through the first initialization line VIL1. The operation of inspecting the display panel DP may be performed by the inspection device IDV, so that the control voltage CV may substantially be applied to the pixel circuit PC by the inspection device IDV.

For example, an initial level of the control voltage CV may be about 0 V. A level of the control voltage CV may gradually vary such that the level of the control voltage CV is lowered. The level of the control voltage CV may gradually decrease to a first level LV1 and a second level LV2 lower than the initial level. The first level LV1 and the second level LV2 may be set to a level of a negative voltage.

During a first period P1, the level of the control voltage CV may gradually decrease from the initial level (e.g., 0 V) to the first level LV1 which is lower than the initial level. In addition, during a second period P2 following the first period P1, the level of the control voltage CV may gradually decrease from the first level LV1 to the second level LV2 which is lower than the first level LV1.

The first level LV1 may be defined as a level of the above-described first gate-source voltage Vgs1. The second level LV2 may be defined as a level of the above-described second gate-source voltage Vgs2. The level of the control voltage CV may gradually decrease from the initial level to the second level by a set (e.g., preset or predetermined) voltage magnitude ΔV. For each frame FRM, the level of the control voltage CV may gradually decrease by the voltage magnitude ΔV.

For example, the first gate-source voltage Vgs1 may be set to about −4 V and the second gate-source voltage Vgs2 may be set to about −8 V. The voltage magnitude ΔV is an absolute value, and may be about 0.2 V. Based on the above numerical value, the level of the control voltage CV may gradually decrease from about 0 V to about −8 V by (e.g., by increments of) about 0.2 V.

The above-described inspection device IDV may gradually vary the control voltage CV during the first period P1 and the second period P2 to apply the control voltage CV to the pixel circuit PC.

In the following description of scan signals, unlike in FIG. 5, the i-th and j-th scan signals are omitted.

Figure 10:
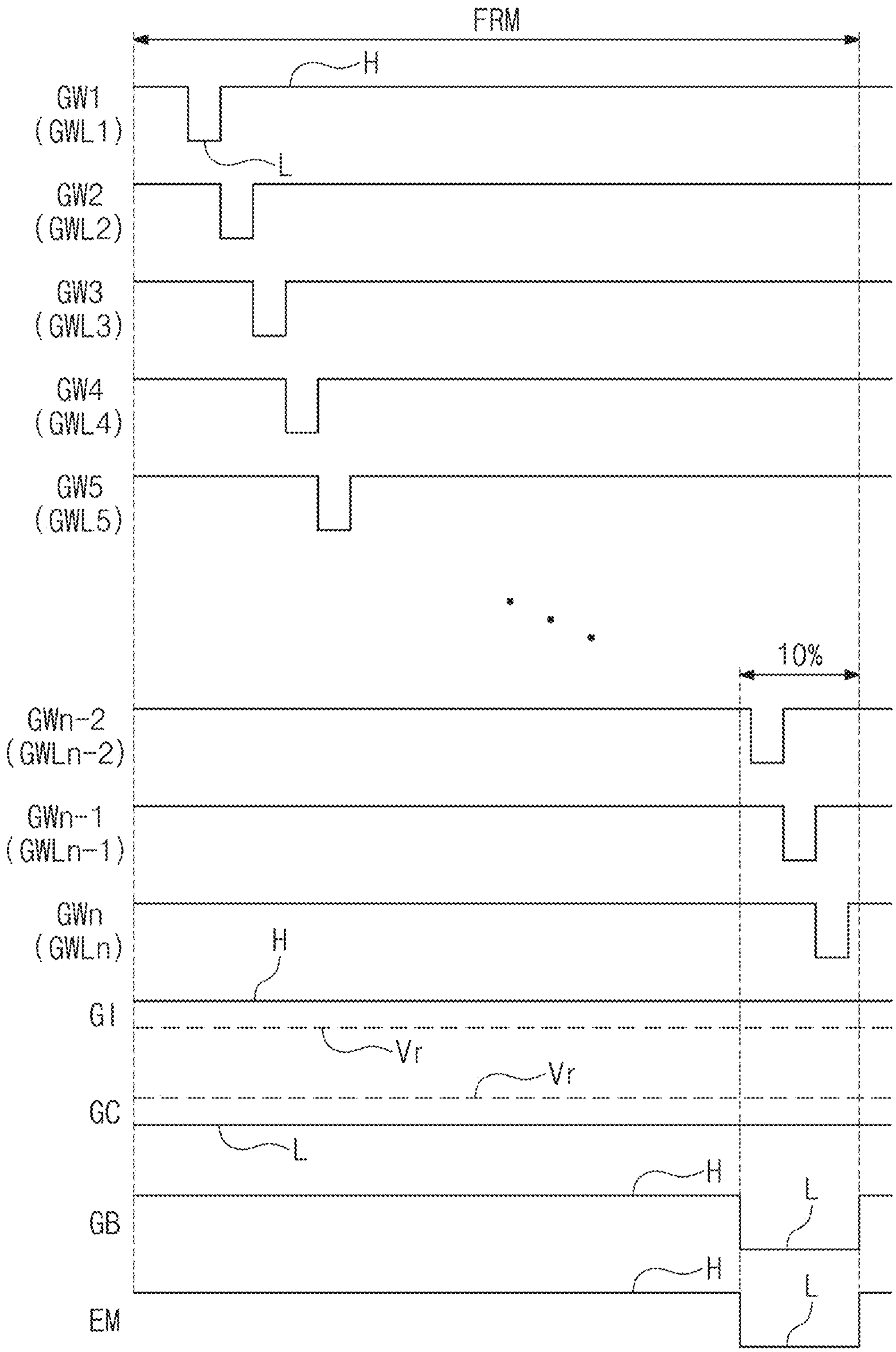
FIG. 10 is a timing diagram of signals applied to pixels during a first period during a test operation of a display panel according to some embodiments of the present disclosure.

FIG. 10 is a timing diagram of signals applied to pixels during a first period during a test operation of a display panel according to some embodiments of the present disclosure.

FIG. 10 illustrates a timing diagram of signals of one frame FRM.

Referring to FIG. 10, first to n-th write scan signals GW1 to GWn may be sequentially applied to the pixels PX. Substantially, the write scan line GWLj illustrated in FIG. 5 may be provided in plurality to be connected to the pixels PX, and through the plurality of write scan lines GWLj, the first to n-th write scan signals GW1 to GWn may be applied to the pixels PX. The write scan lines GWL1 to GWLn may define rows in an arrangement of the pixels PX.

An initialization scan signal GI may have the high level H which is higher than a level of a reference voltage Vr. A compensation scan signal GC may have the low level L which is lower than the level of the reference voltage Vr. For example, the reference voltage Vr may be 0 V. For example, the initialization scan signal GI and the compensation scan signal GC may be applied to each of the fourth transistor T4 and the third transistor T3 of the pixel circuit PC of each of the pixels PX.

A bias scan signal GB and a light emission signal EM may be activated to the low level L when write scan signals GWn−2, GWn−1, and GWn are applied to some write scan lines GWLn−2, GWLn−1, and GWLn among write scan lines GWL1 to GWLn. That is, the bias scan signal GB and the light emission signal EM may be activated to the low level L when the write scan signals GWn−2, GWn−1, and GWn are applied to pixels PX arranged in some rows among rows.

For example, the write scan lines GWLn−2, GWLn−1, and GWLn may correspond to about 10% of the write scan lines GWL1 to GWLn. That is, the bias scan signal GB and the light emission signal EM may be activated to the low level L when the write scan signals GWn−2, GWn−1, and GWn are applied to pixels PX arranged in rows of about 10% of the rows.

For example, the write scan lines GWLn−2, GWLn−1, and GWLn corresponding to the 10% may be set sequentially from the last write scan line among the write scan lines GWL1 to GWLn, but the position of the write scan lines corresponding to the 10% is not limited thereto.

As illustrated in FIG. 5, the bias scan signal GB and the light emission signal EM may be applied to each of the fifth to eighth transistors T5 to T8 of the pixel circuit PC of each of the pixels PX.

For every frame FRM of the first period P1, signals may be applied to the pixel circuit PC of each of the pixels PX with a timing illustrated in FIG. 10.

The above-described inspection device IDV may apply the initialization scan signal GI, the compensation scan signal GC, the write scan signals GW1 to GWn, the bias scan signal GB, and the light emission signal EM to the pixel circuit PC.

Figure 11:
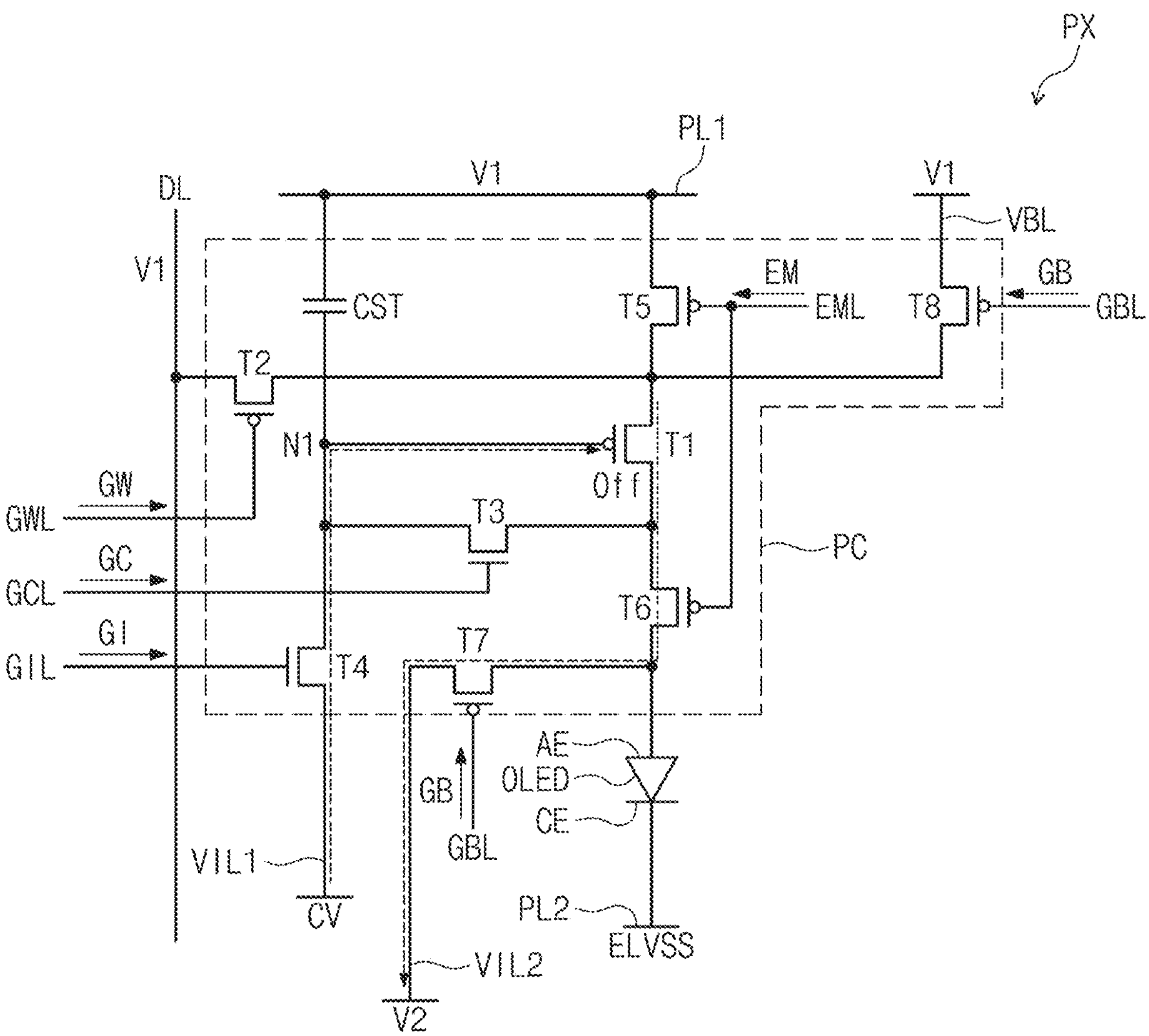
FIG. 11 is a view for describing an operation of a pixel circuit during the first period during a test operation of a display panel according to some embodiments of the present disclosure.

FIG. 11 is a view for describing an operation of a pixel circuit during the first period during a test operation of a display panel according to some embodiments of the present disclosure.

For example, a pixel PX illustrated in FIG. 11 corresponds to the pixel PXij illustrated in FIG. 5, and hereinafter, i and j are omitted from drawings for the pixel circuit PC.

Referring to FIG. 8, FIG. 9, FIG. 10, and FIG. 11, in order to measure the first current range I_RNG1 of the first transistor T1, the display panel DP may be inspected during the first period P1.

For each frame of the first period P1, by the initialization scan signal G1 and the compensation scan signal GC, the fourth transistor T4 may be turned on, and the third transistor T3 may be turned off, respectively. In addition, when the bias scan signal GB and the light emission signal EM is at the low level L, the fifth to eighth transistors T5 to T8 may be turned on.

The pixel PX illustrated in FIG. 11 may be any one of the pixels PX connected to the write scan lines GWLn−2, GWLn−1, and GWLn illustrated in FIG. 10.

When the bias scan signal GB and the light emission signal EM are activated to the low level L, the write scan signal GW activated to the low level L may be applied to the second transistor T2. Therefore, the second transistor T2 of each of the pixels PX arranged in the about 10% of the rows described with reference to FIG. 10 may be turned on.

A first voltage V1 may be applied to the data line DLi, the first power line PL, and the bias line VBL. For example, the initial level of the control voltage CV may be the same as the level of the first voltage V1. Therefore, the first voltage V1 may be, for example, about 0 V. Because the second, fifth, and eighth transistors T2, T5, and T8 may be turned on, the first voltage V1 may be applied to the first electrode of the first transistor T1.

A second voltage V2 having a lower level than the first voltage V1 may be applied to the second initialization line VIL2. For example, the second voltage V2 may be set to a negative voltage. For example, the second voltage V2 may be set to about −5.1 V. Because the sixth and seventh transistors T6 and T7 may be turned on, the second voltage V2 may be applied to the second electrode of the first transistor T1.

The above-described inspection device IDV may apply the first voltage V1 and the second voltage V2 to the pixel circuit PC.

As described above, during the first period P1, the control voltage CV may gradually decrease to the first level LV1 by the set (e.g., preset or predetermined) voltage magnitude ΔV. During the first period P1, the control voltage CV may be applied to the control electrode of the first transistor T1. Therefore, during the first period P1, for each frame FRM, the control voltage CV may be applied to the control electrode of the first transistor T1 while gradually decreasing by the voltage magnitude ΔV.

As described above, the first gate-source voltage Vgs having the first level LV1 may be the threshold voltage Vth. Therefore, when an absolute value of the control voltage CV is smaller than an absolute value of the first level LV1, the first transistor T1 may be turned off.

Even if the first transistor T1 is turned off, a minute current may flow through the first transistor T1. Because the first voltage V1 is applied to the first electrode of the first transistor T1, and the second voltage V2 is applied to the second electrode of the first transistor T1, the current may flow from the first transistor T1 to the second initialization line VIL2. The current flowing through the turned-off first transistor T1 can be defined as an off current (or a leakage current).

The inspection device IDV may measure the current flowing through the first transistor T1 by means of a data line DL. The inspection device IDV may measure the off current of the turned-off first transistor T1.

The first current range I_RNG1 may be defined as an off current range. That is, according to the above-described operation, the first current range I_RNG1 of the first transistor T1 may be measured. A minute off current may be measured by means of pixels PX in a specific region rather than all of the pixels PX. For example, as described above, an off current flowing through the first transistor T1 may be measured in each of the pixels PX arranged in the about 10% of the rows.

Figure 12:
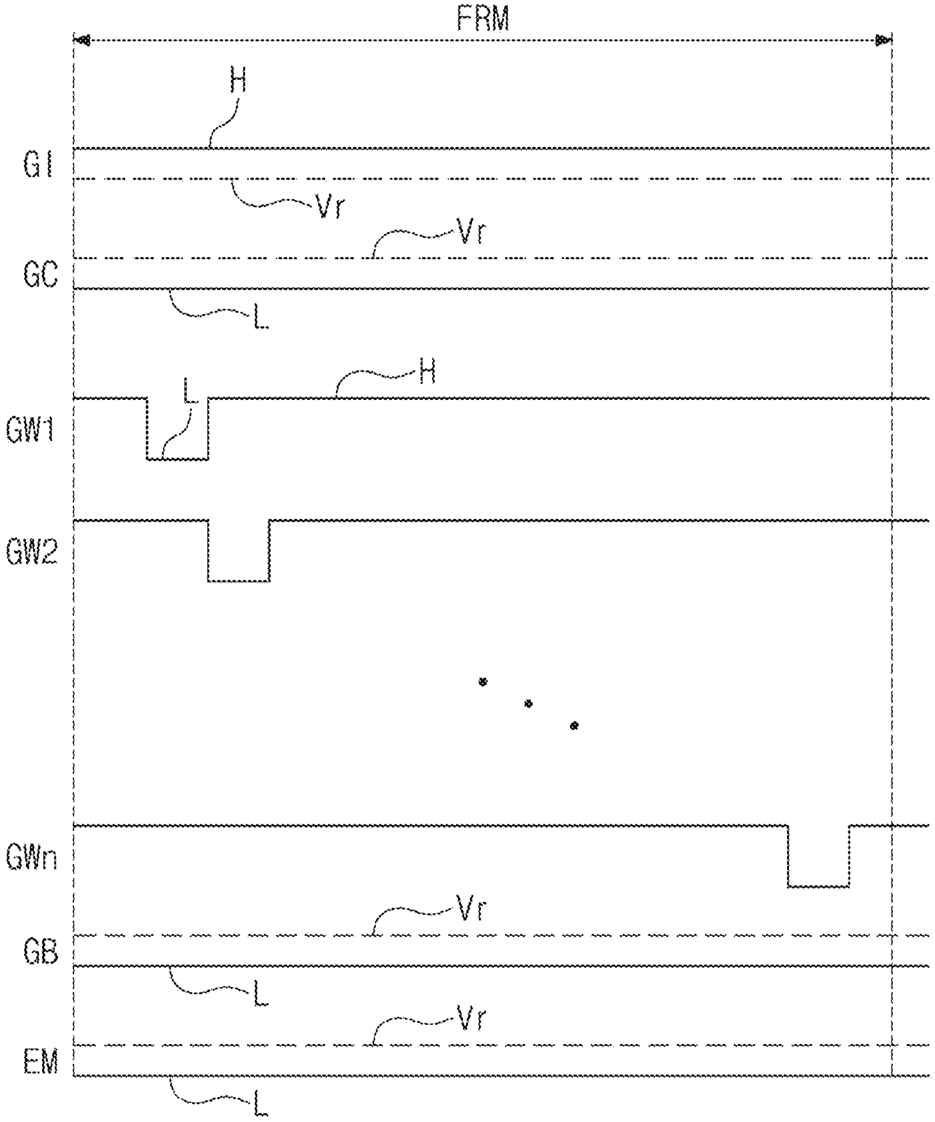
FIG. 12 is a timing diagram of signals applied to pixels during a second period during a test operation of a display panel according to some embodiments of the present disclosure.

FIG. 12 is a timing diagram of signals applied to pixels during a second period during a test operation of a display panel according to some embodiments of the present disclosure.

Referring to FIG. 12, the initialization scan signal GI may have the high level H which is higher than the level of the reference voltage Vr. The compensation scan signal GC may have the low level L which is lower than the level of the reference voltage Vr. The initialization scan signal GI and the compensation scan signal GC may be applied to each of the fourth transistor T4 and the third transistor T3 of the pixel circuit PC.

The bias scan signal GB and the light emission signal EM may have the low level L which is lower than the level of the reference voltage Vr. The bias scan signal GB and the light emission signal EM may be applied to each of the fifth to eighth transistors T5 to T8 of the pixel circuit PC. The write scan signals GW1 to GWn may be sequentially activated to the low level L. Each of the write scan signals GW1 to GWn may be applied to the second transistor T2 of the pixel circuit PC of a corresponding pixel PX.

For every frame FRM of the second period P2, signals may be applied to all of the pixels PX with a timing illustrated in FIG. 12. Unlike in FIG. 10, in FIG. 12, the bias scan signal GB and the light emission signal EM may have an activated low level L during the frame FRM. In this case, a current measurement operation may be performed on the first transistors T1 of all of the pixels PX.

Figure 13:
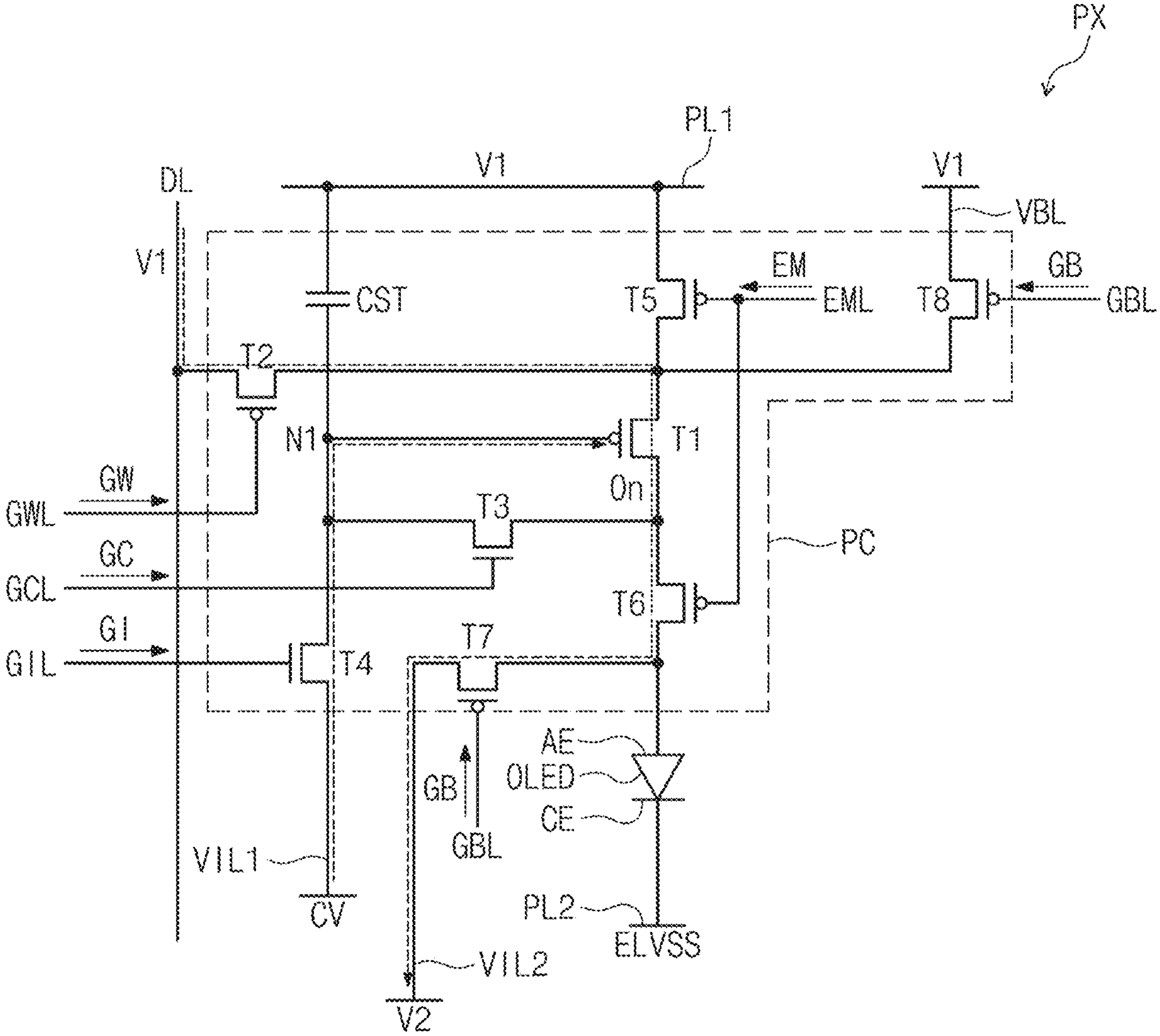
FIG. 13 is a view for describing an operation of a pixel circuit during a second period during a test operation of a display panel according to some embodiments of the present disclosure.

FIG. 13 is a view for describing an operation of a pixel circuit during a second period during a test operation of a display panel according to some embodiments of the present disclosure.

Referring to FIG. 8, FIG. 9, FIG. 12, and FIG. 13, in order to measure the second current range I_RNG2 of the first transistor T1, the display panel DP may be inspected during the second period P2.

For each frame FRM of the second period P2, by the initialization scan signal G1 and the compensation scan signal GC, the fourth transistor T4 may be turned on, and the third transistor T3 may be turned off. In addition, by the bias scan signal GB and the light emission signal EM, the fifth to eighth transistors T5 to T8 may be turned on. When the write scan signal GW activated to the low level L is applied to the second transistor T2, the second transistor T2 may be turned on.

The first voltage V1 may be applied to the data line DL, the first power line PL1, and the bias line VBL, and the second voltage V2 may be applied to the second initialization line VIL2. Therefore, the first voltage V1 may be applied to the first electrode of the first transistor T1, and the second voltage V2 may be applied to the second electrode of the first transistor T1.

As described above, during the second period P2, the control voltage CV may gradually decrease to the second level LV2 by increments of the voltage magnitude ΔV. During the second period P2, the control voltage CV may be applied to the control electrode of the second transistor T2. Therefore, during the second period P2, for each frame FRM, the control voltage CV may be applied to the control electrode of the first transistor T1 while gradually decreasing by the voltage magnitude ΔV.

As described above, the first gate-source voltage Vgs having the first level LV1 may be the threshold voltage Vth. Therefore, when the absolute value of the control voltage CV is smaller than the absolute value of the first level LV1, the first transistor T1 may be turned on. That is, during the second period P2, the first transistor T1 may be turned on.

Because the first voltage V1 may be applied to the first electrode of the first transistor T1, and the second voltage V2 may be applied to the second electrode of the first transistor T1, a current may flow through the data line DL, the first transistor T2, and the second initialization line VIL2. The current flowing through the turned-on first transistor T1 may be defined as an on current.

The inspection device IDV may measure the current flowing through the first transistor T1 by means of a data line DL. The inspection device IDV (see, e.g., FIG. 7) may measure the on current of the turned-on first transistor T1. The second current range I_RNG2 may be defined as an on current range. That is, according to the above-described operation, the second current range I_RNG2 of the first transistor T1 may be measured. A larger on current may be measured through all of the pixels PX to be more precisely measured.

According to the above-described operation, the inspection device IDV may measure the current flowing through the first transistor T1 during the first period P1 and the second period P2, thereby allowing properties of the first transistor T1 to be easily measured. That is, a current-voltage curve of the first transistor T1 may be easily measured. With an average value of values measured in the pixels PX, the current-voltage curve of the first transistor T1 may be calculated.

According to the measured current-voltage curve, whether the display panel DP is defective or not may be inspected. In other words, one may determine whether the display panel DP is defective. A user may experimentally know in advance the range of a current-voltage curve in which the first transistor T1 may operate normally. If the measured current-voltage curve is out of the range of a normal current-voltage curve, the display panel DP may be determined to be defective. If the measured current-voltage curve is within the range of a normal current-voltage curve, the display panel DP may be determined to be normal.

Figure 14:
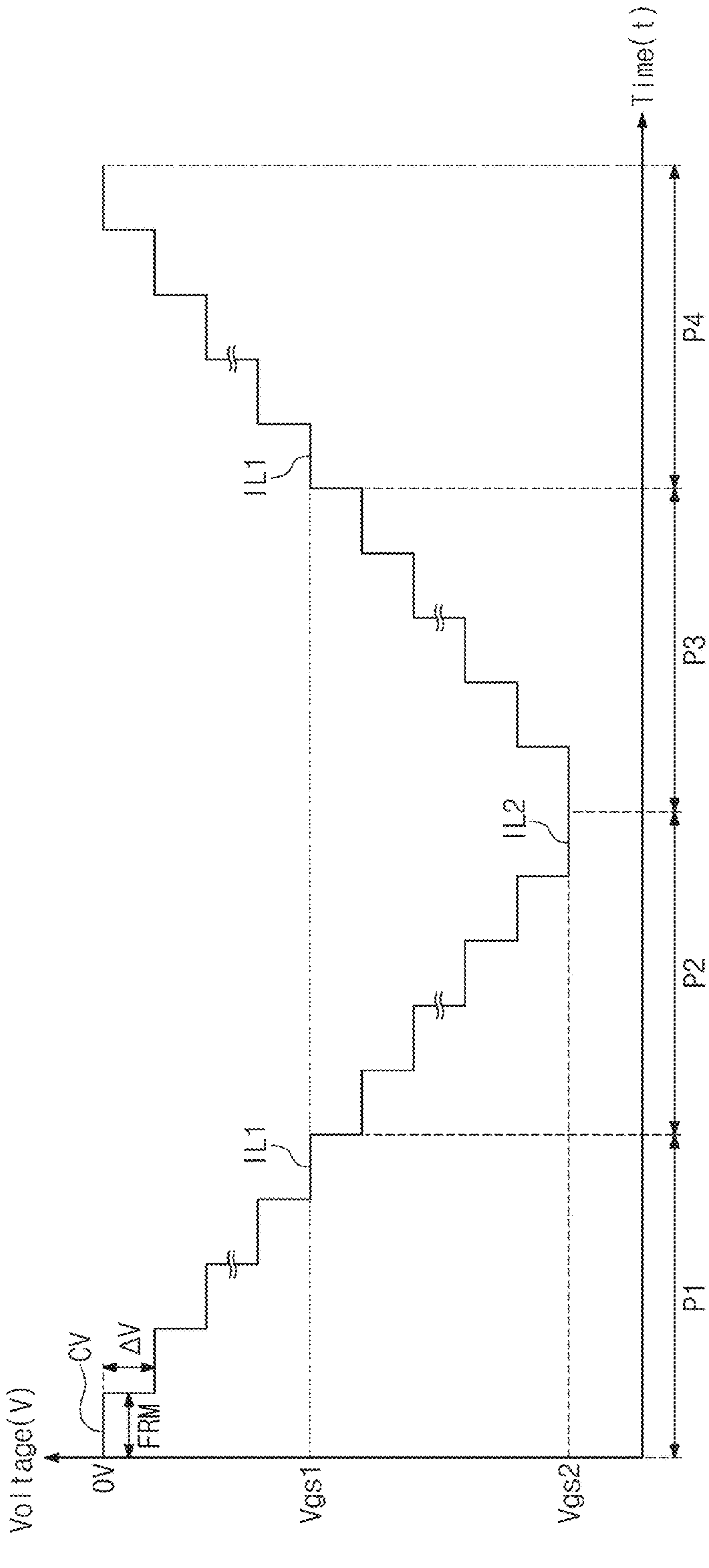
FIG. 14 is a view illustrating changes in the level of a control voltage, for an additional inspection operation of a display panel according to some embodiments of the present disclosure.

FIG. 14 is a view illustrating changes in the level of a control voltage, for an additional inspection operation of a display panel according to some embodiments of the present disclosure.

For example, FIG. 14 illustrates a curve corresponding to that of FIG. 9.

Referring to FIG. 14, as in FIG. 9, the control voltage CV may gradually decrease by increments of the voltage magnitude ΔV during the first and second periods P1 and P2. Additionally, the level of the control voltage CV may gradually increase from the second level LV2 to the initial level (e.g., about 0 V) during the third and fourth periods P3 and P4 following the second period P2. The level of the control voltage CV for each frame FRM of the third period P3 and the fourth period P4 may gradually increase by increments of the voltage magnitude ΔV.

The level of the control voltage CV may gradually increase from the second level LV2 to the first level LV1 during the third period P3. In addition, the level of the control voltage CV may gradually increase from the first level LV1 to the initial level (e.g., about 0 V) during the fourth period P4 following the third period P3.

The third period P3 may be defined as a period during which the level of the control voltage CV gradually increases to be symmetrical to the second period P2. The fourth period P4 may be defined as a period during which the level of the control voltage CV gradually increases to be symmetrical to the first period P1.

Figure 15:
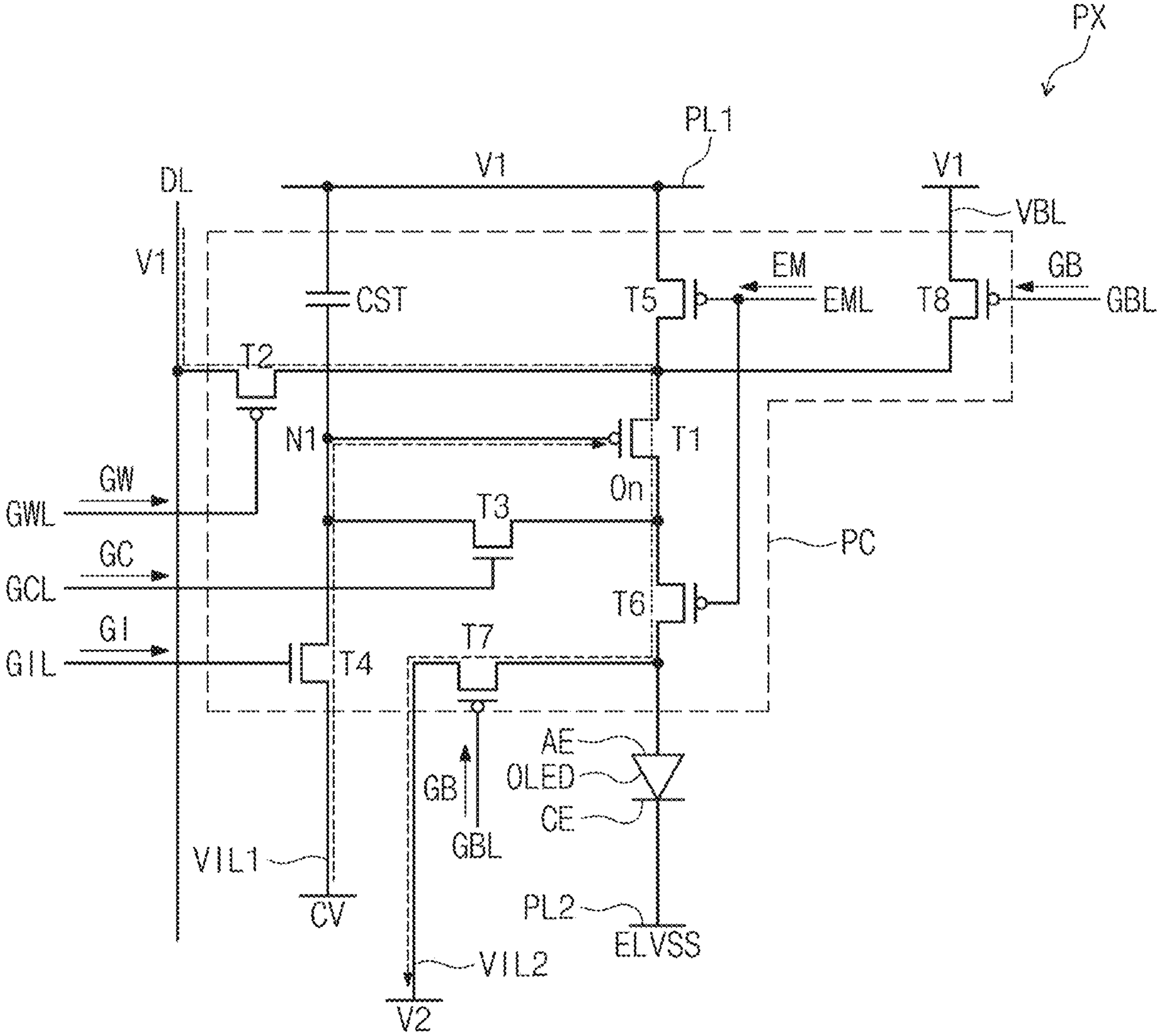
FIG. 15 is a view for describing an operation of a pixel circuit during a third period during a test operation of a display panel according to some embodiments of the present disclosure.
Figure 16:
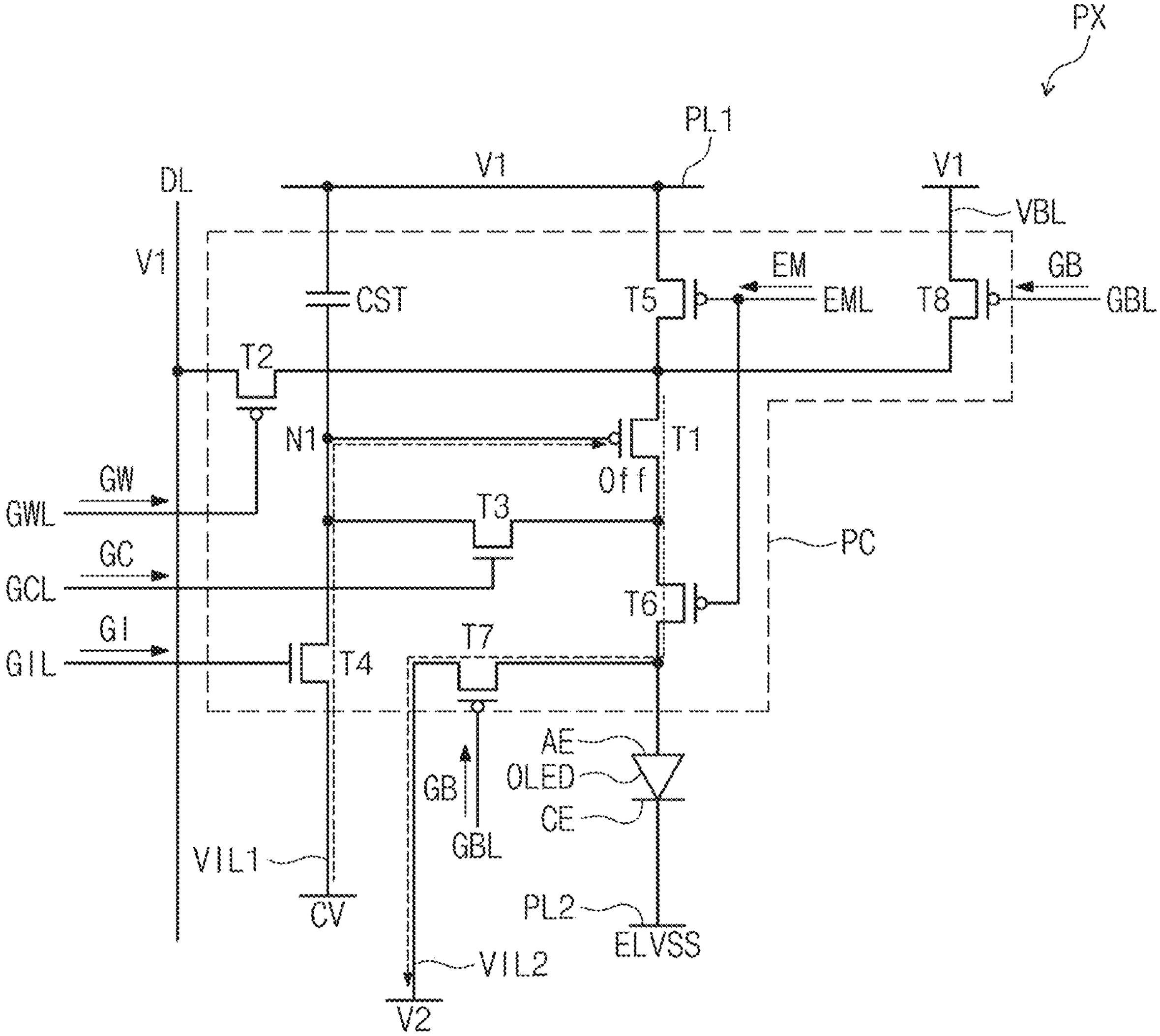
FIG. 16 is a view for describing an operation of a pixel circuit during a fourth period during a test operation of a display panel according to some embodiments of the present disclosure.

FIG. 15 is a view for describing an operation of a pixel circuit during a third period during a test operation of a display panel according to some embodiments of the present disclosure. FIG. 16 is a view for describing an operation of a pixel circuit during a fourth period during a test operation of a display panel according to some embodiments of the present disclosure.

Referring to FIG. 15, the operation of the pixel circuit PC for the third period P3 may be the same as the operation of the pixel circuit PC for the second period P2 illustrated in FIG. 13, except for an operation in which the level of the control voltage CV increases. Therefore, during the third period P3, the level of the control voltage CV may gradually increase by increments of the voltage magnitude ΔV for each frame FRM, so that the on current of the first transistor T1 may be measured.

Referring to FIG. 16, the operation of the pixel circuit PC for the fourth period P4 may be the same as the operation of the pixel circuit PC for the first period P1 illustrated in FIG. 11, except for an operation in which the level of the control voltage CV increases. Therefore, during the fourth period P4, the level of the control voltage CV may gradually increase by the voltage magnitude ΔV for each frame FRM, so that the off current of the first transistor T1 may be measured.

With the operation illustrated in FIG. 11 and FIG. 13, the level of the control voltage CV gradually decreases, so that the current flowing through the first transistor T1 may be measured. With the operation illustrated in FIG. 15 and FIG. 16, the level of the control voltage CV gradually increases, so that the current flowing through the first transistor T1 may be measured.

Figure 17:
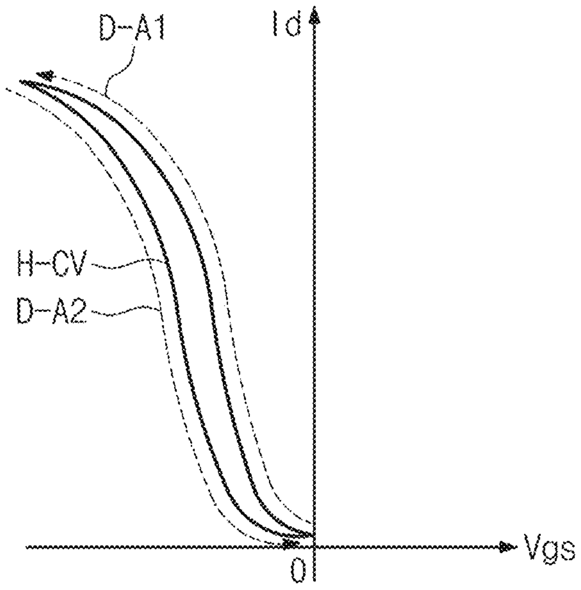
FIG. 17 is a view illustrating a hysteresis curve of a first transistor measured according to an operation of the pixel circuit illustrated in FIG. 11 and FIG. 13 and an operation of the pixel circuit illustrated in FIG. 15 and FIG. 16 according to some embodiments of the present disclosure.

FIG. 17 is a view illustrating a hysteresis curve of a first transistor measured according to an operation of the pixel circuit illustrated in FIG. 11 and FIG. 13 and an operation of the pixel circuit illustrated in FIG. 15 and FIG. 16 according to some embodiments of the present disclosure.

According to the operation illustrated in FIG. 11 and FIG. 13, the level of the control voltage CV gradually decreases, so that the current flowing through the first transistor T1 may be measured. A first dotted arrow D-A1 indicates a state in which the level of the control voltage CV is gradually decreased.

According to the operation illustrated in FIG. 15 and FIG. 16, the level of the control voltage CV gradually increases, so that the current flowing through the first transistor T1 may be measured. A second dotted arrow D-A2 indicates a state in which the level of the control voltage CV is gradually increased.

When the level of the control voltage CV gradually decreases and when the level of the control voltage CV gradually increases, the first transistor T1 may have different current-voltage curves. The above current-voltage curve of the first transistor T1 may be defined as a hysteresis curve H-CV of the first transistor T1. Therefore, in some embodiments of the present disclosure, the hysteresis curve H-CV of the first transistor T1 may be easily measured.

Figure 18:
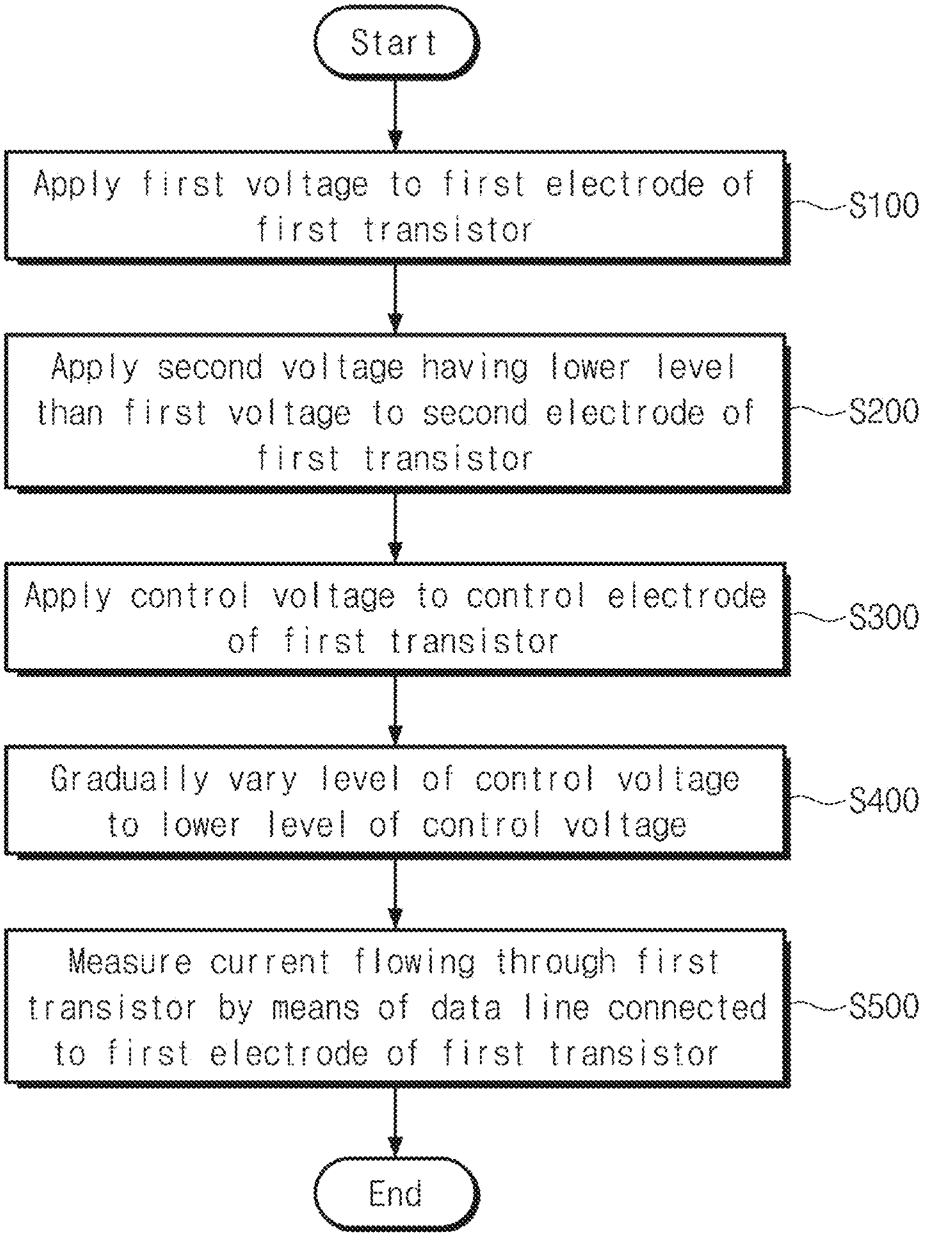
FIG. 18 is a view showing, as a flowchart, the above-described method for inspecting a display panel according to some embodiments of the present disclosure.
Figure 19:
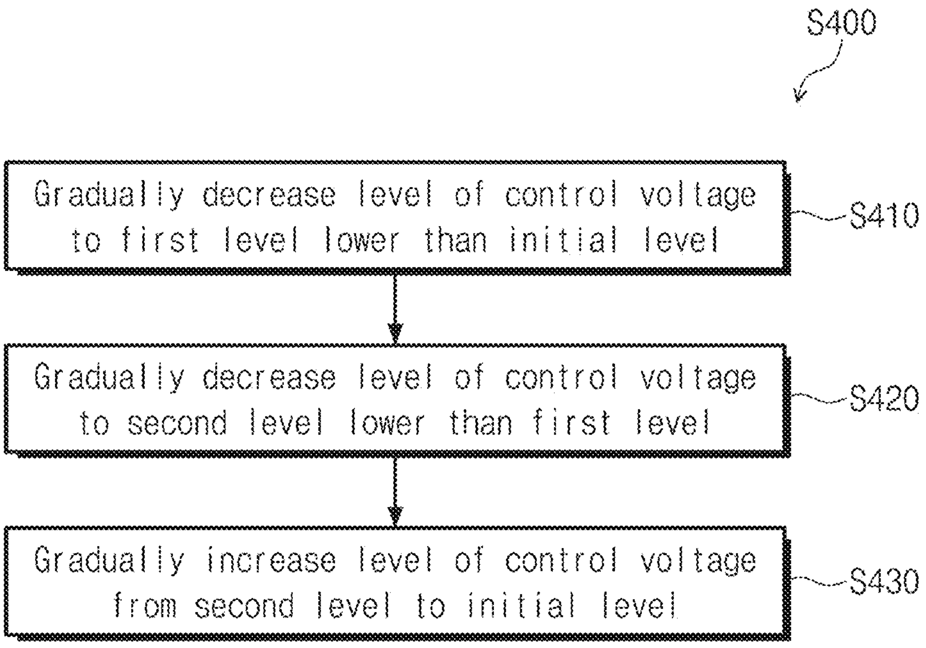
FIG. 19 is a flowchart for describing the process of varying the level of a control voltage illustrated in FIG. 18 according to some embodiments of the present disclosure.

FIG. 18 is a view showing, as a flowchart, the above-described method for inspecting a display panel according to some embodiments of the present disclosure. FIG. 19 is a flowchart for describing a process of varying the level of a control voltage illustrated in FIG. 18 according to some embodiments of the present disclosure.

Referring to FIG. 18, a first voltage V1 may be applied to a first electrode of a first transistor T1 (S100). A second voltage having a lower level than the first voltage may be applied to a second electrode of the first transistor T1 (S200). A control voltage may be applied to a control electrode of the first transistor T1 (S300).

A level of the control voltage may gradually vary such that the level of the control voltage CV is lowered (S400). The varying of the level of the control voltage CV may include the processes illustrated in FIG. 19.

Referring to FIG. 9 and FIG. 19, the level of the control voltage CV may gradually decrease to a first level LV1 which is lower than an initial level (S410). The level of the control voltage CV may gradually decrease to a second level LV2 which is lower than the first level LV1 (S420).

Referring to FIG. 14 and FIG. 19, the level of the control voltage CV may gradually increase from the second level LV2 to the initial level (S430).

Referring again to FIG. 18, a current flowing through the first transistor T1 may be measured by means of a data line DL connected to the first electrode of the first transistor T1 (S500).

According to some embodiments of the present disclosure, a first voltage may be applied to a first electrode of a driving transistor, a second voltage may be applied to a second electrode of the driving transistor, and a control voltage may be applied to a control electrode of the driving transistor. As the control voltage gradually decreases to a set (e.g., preset or predetermined) level, a current flowing through the driving transistor is measured, so that properties of the driving transistor may be easily measured.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A method for inspecting a display panel, the method comprising:

in a pixel comprising a light emitting element and a first transistor connected to the light emitting element, applying a first voltage to a first electrode of the first transistor;

applying a second voltage having a lower level than the first voltage to a second electrode of the first transistor;

applying a control voltage to a control electrode of the first transistor;

gradually varying a level of the control voltage such that the level of the control voltage is lowered; and measuring a current flowing through the first transistor via a data line connected to the first electrode of the first transistor, wherein an initial level of the control voltage is the same as the level of the first voltage, wherein the varying of the level of the control voltage comprises gradually decreasing the level of the control voltage to a first level that is lower than the initial level, and wherein the first transistor is turned on based on an absolute value of the control voltage being larger than an absolute value of the first level.

2. The method of claim 1, wherein the first transistor is turned off based on an absolute value of the control voltage being smaller than an absolute value of the first level.

3. The method of claim 2, wherein the measuring of a current flowing through the first transistor comprises measuring an off current flowing through the first transistor that is turned off.

4. The method of claim 1, wherein the varying of the level of the control voltage further comprises gradually decreasing the level of the control voltage to a second level that is lower than the first level.

5. The method of claim 4, wherein the measuring of a current flowing through the first transistor comprises measuring an on current flowing through the first transistor that is turned on.

6. The method of claim 4, wherein the level of the control voltage gradually decreases by a set voltage magnitude from the initial level to the second level.

7. The method of claim 4, wherein the varying of the level of the control voltage further comprises gradually increasing the level of the control voltage from the second level to the initial level.

8. The method of claim 4, wherein the first level and the second level are set to a level of a negative voltage.

9. The method of claim 1, wherein the initial level is 0 V.

10. The method of claim 1, wherein the second voltage is set to a negative voltage.

11. The method of claim 1, wherein the first transistor is a PMOS transistor.

12. The method of claim 1, wherein the pixel further comprises:

a second transistor connected to the data line and the first electrode of the first transistor, and configured to be selectively switched by a write scan signal;

a third transistor connected to the second electrode of the first transistor and the control electrode of the first transistor, and configured to be selectively switched by a compensation scan signal;

a fourth transistor connected to a first initialization line to which the control voltage is applied and the control electrode of the first transistor, and configured to be selectively switched by an initialization scan signal;

a fifth transistor connected to a first power line and the first electrode of the first transistor, and configured to be selectively switched by a light emission signal;

a sixth transistor connected to the second electrode of the first transistor and an anode of the light emitting element, and configured to be selectively switched by the light emission signal;

a seventh transistor connected to the anode of the light emitting element and a second initialization line to which the second voltage is applied, and configured to be selectively switched by a bias scan signal;

an eighth transistor connected to the first electrode of the first transistor and a bias line, and configured to be selectively switched by the bias scan signal; and a capacitor connected to the first power line and the control electrode of the first transistor, wherein the first voltage is applied to the data line, the first power line, and the bias line.

13. The method of claim 12, wherein the third transistor is turned off, and the second, fourth, fifth, sixth, seventh, and eighth transistors are turned on based on the current flowing through the first transistor being measured.

14. The method of claim 12, wherein:

a plurality of pixels comprising the pixel are arranged in rows and columns;

the level of the control voltage gradually decreases to the first level; and in each one of the pixels arranged in rows of 10% of all rows, a current flowing through the first transistor is measured.

15. The method of claim 14, wherein the second transistor of each one of the pixels arranged in the 10% of all rows is turned on by the write scan signal in response to the bias scan signal and the light emission signal being activated to a level for turning on the fifth to eighth transistors.

16. A method for inspecting a display panel, the method comprising:

applying a first voltage to a first electrode of a first transistor connected to a light emitting element;

applying a second voltage having a lower level than the first voltage to a second electrode of the first transistor;

applying a control voltage to a control electrode of the first transistor;

gradually varying a level of the control voltage such that the level of the control voltage is lowered; and measuring a current flowing through the first transistor via a data line connected to the first electrode of the first transistor, wherein the varying of the level of the control voltage comprises:

gradually decreasing the level of the control voltage to a first level which is lower than an initial level; and gradually decreasing the level of the control voltage to a second level which is lower than the first level, wherein the first transistor is turned off based on an absolute value of the control voltage being smaller than an absolute value of the first level; and wherein the first transistor is turned on based on the absolute value of the control voltage being larger than the absolute value of the first level.

17. The method of claim 16, wherein the level of the control voltage gradually decreases by increments of a set voltage magnitude from the initial level to the second level.

18. The method of claim 16, wherein the varying of the level of the control voltage further comprises gradually increasing the level of the control voltage from the second level to the initial level.

* * * * *